(12) United States Patent
Yamamoto et al.

(10) Patent No.: US 9,182,746 B2
(45) Date of Patent: Nov. 10, 2015

(54) STEPPING MOTOR CONTROL CIRCUIT, MOVEMENT AND ANALOG ELECTRONIC TIMEPIECE

(71) Applicant: SEIKO INSTRUMENTS INC., Chiba (JP)

(72) Inventors: Kosuke Yamamoto, Chiba (JP); Saburo Manaka, Chiba (JP); Kazumi Sakumoto, Chiba (JP); Kenji Ogasawara, Chiba (JP); Keishi Honmura, Chiba (JP); Satoshi Sakai, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 245 days.

(21) Appl. No.: 14/013,120

(22) Filed: Aug. 29, 2013

(65) Prior Publication Data
US 2014/0071794 A1 Mar. 13, 2014

(30) Foreign Application Priority Data

| Sep. 7, 2012 | (JP) | 2012-197538 |
| Nov. 28, 2012 | (JP) | 2012-260264 |
| Dec. 14, 2012 | (JP) | 2012-273939 |
| Mar. 13, 2013 | (JP) | 2013-050534 |
| Jul. 9, 2013 | (JP) | 2013-143784 |

(51) Int. Cl.
*G04C 3/14* (2006.01)
*H02P 8/38* (2006.01)
*H02P 8/02* (2006.01)
*H02P 8/16* (2006.01)

(52) U.S. Cl.
CPC .............. *G04C 3/143* (2013.01); *H02P 8/02* (2013.01); *H02P 8/16* (2013.01); *H02P 8/38* (2013.01)

(58) Field of Classification Search
CPC .......... G04C 3/143; H02P 8/38; G04R 60/10; G04G 9/08
See application file for complete search history.

(56) References Cited

U.S. PATENT DOCUMENTS

| 2006/0114750 A1* | 6/2006 | Iida et al. .................... 368/67 |
| 2008/0089183 A1 | 4/2008 | Manaka et al. ............... 368/202 |
| 2009/0238044 A1* | 9/2009 | Satoh et al. .................. 368/155 |
| 2010/0172219 A1 | 7/2010 | Manaka et al. ................ 368/80 |
| 2010/0254226 A1* | 10/2010 | Ogasawara et al. ............ 368/80 |
| 2010/0270965 A1* | 10/2010 | Hasegawa et al. ............ 318/696 |

* cited by examiner

*Primary Examiner* — Sean Kayes
(74) *Attorney, Agent, or Firm* — Adams & Wilks

(57) ABSTRACT

A stepping motor control circuit includes: a rotation detection unit that detects a induced signal exceeding a predetermined reference threshold voltage which is generated by a stepping motor in a detection section divided into at least three sections, and detects a rotation state on the basis of a pattern indicating whether the induced signal exceeding a reference threshold voltage is detected in each of the sections; and a control unit that selects a main drive pulse depending on the rotation state detected by the rotation detection unit from a plurality of main drive pulses which are different from each other in energy, and drives the stepping motor. When the induced signal exceeding a reference threshold voltage is not detected in an initial section, the rotation detection unit detects the induced signal by shifting an end position of at least one section other than the initial section to a rear side by a predetermined amount.

20 Claims, 14 Drawing Sheets

FIG. 3

| STATE | ROTATION BEHAVIOR | VRs OUTPUT TIMING | T1 | T2 | T3 | CONTROL CIRCUIT OPERATION |
|---|---|---|---|---|---|---|
| NORMAL HANDS AND SUFFICIENT ENERGY | | | 0 | 1 | 0 | PCD AND RANK-DOWN POSSIBLE |
| LARGE MOUNTED HANDS AND SUFFICIENT ENERGY | | | 0 | 1 | 0 | PCD AND RANK-DOWN POSSIBLE |
| SLIGHTLY LOW ENERGY | | | 1 | 1 | 0 | RANK MAINTENANCE |
| CONSIDERABLY LOW ENERGY | | | | | | RANK UP |
| CONSIDERABLY LOW ENERGY | | | 0 | 0 | 1 | RANK UP |
| P1 NON-ROTATION | | | 1 | 0 | 0 | P2 + RANK UP |

FIG. 4

BEFORE CHANGE

| T1 | T2 | T3 | ENERGY STATE | OPERATION AFTER DETECTION |
|---|---|---|---|---|
| 0 | 1 | 0/1 | SUFFICIENT ENERGY | NORMAL DRIVING (COUNT) ⇒ RANK DOWN BY A PREDETERMINED NUMBER OF TIMES |
| 0 | 0 | 1 | LARGE MOUNTED HANDS AND SUFFICIENT ENERGY OR CONSIDERABLY LOW ENERGY | P1 RANK UP |
| 1 | 1 | 0/1 | SLIGHTLY LOW ENERGY OR MAXIMUM DRIVE MARGIN | NORMAL DRIVING (COUNT RESET) (RANK-DOWN PROHIBITION) |
| 1 | 0 | 1 | CONSIDERABLY LOW ENERGY | P1 RANK UP |
| 0/1 | 0 | 0 | NON-ROTATION | CORRECTION DRIVING P2 OUTPUT ⇒ P1 RANK UP |

AFTER CHANGE

| T1 | T2 | T3 | ENERGY STATE | OPERATION AFTER DETECTION |
|---|---|---|---|---|
| 0 | 1 | 0/1 | NORMAL MOUNTED HANDS, LARGE MOUNTED HANDS AND SUFFICIENT ENERGY | NORMAL DRIVING (COUNT) ⇒ RANK DOWN BY A PREDETERMINED NUMBER OF TIMES |
| 1 | 1 | 0/1 | SLIGHTLY LOW ENERGY | NORMAL DRIVING (COUNT RESET) (RANK-DOWN PROHIBITION) |
| 0/1 | 0 | 1 | CONSIDERABLY LOW ENERGY | P1 RANK UP |
| 0/1 | 0 | 0 | NON-ROTATION | CORRECTION DRIVING P2 OUTPUT ⇒ P1 RANK UP |

FIG. 6

| STATE | ROTATION BEHAVIOR | VRs OUTPUT TIMING | T1 | T2 | T3 | CONTROL CIRCUIT OPERATION |
|---|---|---|---|---|---|---|
| NORMAL HANDS AND SUFFICIENT ENERGY | | | 0 | 1 | 0 | PCD AND RANK-DOWN POSSIBLE |
| LARGE MOUNTED HANDS AND SUFFICIENT ENERGY | | | 0 | 1 | 0 | PCD AND RANK-DOWN POSSIBLE |
| NORMAL HANDS AND SLIGHTLY LOW ENERGY | | | 1 | 1 | 0 | RANK MAINTENANCE |
| LARGE MOUNTED HANDS AND SLIGHTLY LOW ENERGY 1 | | | 1 | 0 | 1 | RANK UP |
| LARGE MOUNTED HANDS AND SLIGHTLY LOW ENERGY 2 | | | 1 | 1 | 0 | RANK MAINTENANCE |
| CONSIDERABLY LOW ENERGY | | | 1 | 0 | 1 | RANK UP |
| CONSIDERABLY LOW ENERGY | | | 0 | 0 | 1 | RANK UP |
| P1 NON-ROTATION | | | 1 | 0 | 0 | P2 + RANK UP |

FIG. 8

| STATE | ROTATION BEHAVIOR | VRs OUTPUT TIMING | T1 | T comp1 | T2 | T3 | DETERMINATION |
|---|---|---|---|---|---|---|---|
| LARGE DRIVE MARGIN | | | 0 | FRONT SIDE | 1 | 0 | PCD COUNT ↓ RANK DOWN |
| NORMAL DRIVE MARGIN | | | 0 | FRONT SIDE | 1 | 0 | PCD COUNT ↓ RANK DOWN |
| SLIGHTLY LOW ENERGY | | | 1 | REAR SIDE | 1 | 0 | PCD RESET ↓ RANK MAINTENANCE |
| CONSIDERABLY LOW ENERGY | | | 1 | REAR SIDE | 0 | 1 | RANK UP |
| SLIGHT DRIVE MARGIN | | | 0 | REAR SIDE | 0 | 1 | RANK UP |
| NON-ROTATION | | | 1 | REAR SIDE | 0 | 0 | NON-ROTATION ↓ P2 GENERATION |

FIG. 9

| T1 | T2 | T3 | OPERATION AFTER DETECTION |
|---|---|---|---|
| 0 | 1 | 0/1 | NORMAL DRIVING (COUNT) ⇒ RANK DOWN BY A PREDETERMINED NUMBER OF TIMES |
| 0 | 1 | 0/1 | NORMAL DRIVING (COUNT RESET) |
| 0/1 | 0 | 1 | P1 RANK UP |
| 0/1 | 0 | 0 | CORRECTION DRIVING P2 OUTPUT ⇒ P1 RANK UP |

FIG. 12

| STATE | ROTATION BEHAVIOR | VRs OUTPUT TIMING | T1 | T2 | T3 | MOTOR BEHAVIOR |
|---|---|---|---|---|---|---|
| SUFFICIENT ENERGY (NORMAL DRIVING) | | DETECTION TIME Tcomp1 T1, DETECTION TIME T2, DETECTION TIME T3, Vcomp, Vmax | 0 | 1 | 0 | [ROTOR STATE] ROTATION BY SUFFICIENT ENERGY (NORMAL ROTATION) [DETECTION RESULT] ROTATION DETECTION (RANK DOWN) [OPERATION RESULT] P1 DRIVING⇒ RANK DOWN |
| SLIGHTLY LOW ENERGY | | DETECTION TIME Tcomp2 T1, DETECTION TIME T2, DETECTION TIME T3, Vcomp, Vmax | 1 | 1 | 0 | [ROTOR STATE] ROTATION WITH SLIGHTLY LOW ENERGY [DETECTION] ROTATION DETECTION (RANK MAINTENANCE) [OPERATION RESULT] P1 DRIVING RANK MAINTENANCE⇒ (NO RANK DOWN) |
| CONSIDERABLY LOW ENERGY | | DETECTION TIME Tcomp1 T1, DETECTION TIME T2, DETECTION TIME T3, Vmax, Vcomp | 1 | 0 | 1 | [ROTOR STATE] ROTATION WITH CONSIDERABLY LOW ENERGY [DETECTION] ROTATION DETECTION (RANK UP) [OPERATION RESULT] P1 DRIVING⇒ RANK UP |
| VERY LOW ENERGY | | DETECTION TIME Tcomp2 T1, DETECTION TIME T2, DETECTION TIME T3, Vmax, Vcomp | 1 | 0 | 1 | [ROTOR STATE] ROTATION WITH VERY LOW ENERGY [DETECTION] ROTATION DETECTION (RANK UP REQUIRED) [OPERATION RESULT] P1 DRIVING ⇒ RANK UP |
| NON-ROTATION (MIDWAY STOP) | | DETECTION TIME Tcomp2 T1, DETECTION TIME T2, DETECTION TIME T3, Vcomp | 1 | 0 | 0 | [ROTOR STATE] NON-ROTATION (MIDWAY STOP) [DETECTION] NON-ROTATION DETECTION [OPERATION RESULT] P1 NON-ROTATION ⇒ P2 OUTPUT⇒ROTATION |
| NON-ROTATION (P1 NON-ROTATION) | | DETECTION TIME Tcomp2 T1, DETECTION TIME T2, DETECTION TIME T3, Vcomp | 1 | 0 | 0 | [ROTOR STATE] NON-ROTATION [DETECTION] NON-ROTATION DETECTION [OPERATION RESULT] P2 DRIVING⇒RANK UP |

FIG. 13

| STATE | ROTATION BEHAVIOR | VRs OUTPUT TIMING | T1 | T2 | T3 | MOTOR BEHAVIOR |
|---|---|---|---|---|---|---|
| SUFFICIENT ENERGY (NORMAL DRIVING) | | DETECTION TIME T1 Tcomp1, DETECTION TIME T2, DETECTION TIME T3; Vmax; Vcomp | 0 | 1 | 0 | [ROTOR STATE] ROTATION BY SUFFICIENT ENERGY (NORMAL ROTATION) [DETECTION RESULT] ROTATION DETECTION (RANK DOWN) [OPERATION RESULT] P1 DRIVING ⇒ RANK DOWN |
| SLIGHTLY LOW ENERGY | | DETECTION TIME T1 Tcomp2, DETECTION TIME T2, DETECTION TIME T3; Vmax; Vcomp | 1 | 1 | 0 | [ROTOR STATE] ROTATION WITH SLIGHTLY LOW ENERGY [DETECTION] ROTATION DETECTION (RANK MAINTENANCE) [OPERATION RESULT] P1 DRIVING ⇒ RANK MAINTENANCE (NO RANK DOWN) |
| CONSIDERABLY LOW ENERGY | | DETECTION TIME T1 Tcomp1, DETECTION TIME T2, DETECTION TIME T3; Vmax; Vcomp | 1 | 0 | 1 | [ROTOR STATE] ROTATION WITH CONSIDERABLY LOW ENERGY [DETECTION] ROTATION DETECTION (RANK UP) [OPERATION RESULT] P1 DRIVING ⇒ RANK UP |
| VERY LOW ENERGY | | DETECTION TIME T1 Tcomp2, DETECTION TIME T2, DETECTION TIME T3; Vmax; Vcomp | 1 | 1 | 1 | [ROTOR STATE] ROTATION WITH VERY LOW ENERGY [DETECTION] ROTATION DETECTION (RANK MAINTENANCE) [OPERATION RESULT] P1 DRIVING ⇒ RANK MAINTENANCE (RANK UP IMPOSSIBLE) |
| NON-ROTATION (MIDWAY STOP) | | DETECTION TIME T1 Tcomp2, DETECTION TIME T2, DETECTION TIME T3; Vcomp | 0 | 1 | 0 | [ROTOR STATE] NON-ROTATION (MIDWAY STOP) [DETECTION] ROTATION DETECTION [OPERATION RESULT] P1 NON-ROTATION ⇒ NO P2 OUTPUT ⇒ STOP |
| NON-ROTATION (P1 NON-ROTATION) | | DETECTION TIME T1 Tcomp2, DETECTION TIME T2, DETECTION TIME T3; Vcomp | 1 | 0 | 0 | [ROTOR STATE] NON-ROTATION [DETECTION] NON-ROTATION DETECTION [OPERATION RESULT] P2 DRIVING ⇒ RANK UP |

FIG. 14

| STATE | ROTATION BEHAVIOR | VRs OUTPUT TIMING | T1 | T2 | T3 | MOTOR BEHAVIOR |
|---|---|---|---|---|---|---|
| VERY LOW ENERGY | P1, a, b, c | Detection Time Tcomp1 T1, Tcomp2 Detection Time T2, Detection Time T3, Vcomp, regions a/b/c | 0 | 1 | 0/1 | [ROTOR STATE] ROTATION OR NON-ROTATION WITH VERY LOW ENERGY [DETECTION] ROTATION DETECTION (RANK DOWN) [OPERATION RESULT] P1 DRIVING ⇒ RANK UP IMPOSSIBLE |
| NON-ROTATION (MIDWAY STOP) | P1 | Detection Time Tcomp1 T1, Tcomp2 Detection Time T2, Detection Time T3, Vcomp, region a | WHEN CHANGE TO Tcomp1 IS PERFORMED IMMEDIATELY: 0 | 1 | 0 | [ROTOR STATE] NON-ROTATION (MIDWAY STOP) [DETECTION] ROTATION DETECTION [OPERATION RESULT] P1 NON-ROTATION ⇒ NO P2 OUTPUT ⇒ STOP |
| | | | TIME WHEN Tcomp2 IS MAINTAINED FOR A CONSTANT PERIOD OF TIME: 1 | 0 | 0 | [ROTOR STATE] NON-ROTATION (MIDWAY STOP) [DETECTION] NON-ROTATION DETECTION [OPERATION RESULT] P1 NON-ROTATION ⇒ P2 OUTPUT ⇒ ROTATION |

FIG. 15

| T1 | T2 | T3 | OPERATION AFTER DETECTION |
|---|---|---|---|
| 0 | 1 | 0/1 | NORMAL DRIVING (COUNT) ⇒ RANK DOWN BY A PREDETERMINED NUMBER OF TIMES |
| 1 | 1 | 0/1 | NORMAL DRIVING (COUNT RESET) ⇒ RANK MAINTENANCE |
| 0/1 | 0 | 1 | P1 RANK UP |
| 0/1 | 0 | 0 | CORRECTION DRIVING P2 OUTPUT ⇒ P1 RANK UP |

STEPPING MOTOR CONTROL CIRCUIT, MOVEMENT AND ANALOG ELECTRONIC TIMEPIECE

BACKGROUND OF THE INVENTION

1. Field of the Invention

The present invention relates to a stepping motor control circuit that controls the driving of a stepping motor, a movement including the stepping motor control circuit, and an analog electronic timepiece including the movement.

2. Background Art

Hitherto, in analog electronic timepieces, a drive system has been developed in which, when a plurality of main drive pulses P1 are prepared and a stepping motor is driven by any of the main drive pulses P1, pulses are controlled so that a change (rank-down) to the main drive pulse P1 having small energy is performed in a case where energy of the main drive pulse P1 has a drive margin, and a change (rank-up) to the main drive pulse P1 having large energy is performed in a case where energy of the main drive pulse P1 has no drive margin, thereby allowing the stepping motor to be stably rotationally driven and allowing electric power saving to be achieved.

Drive systems are developed in which at the time of detecting whether the energy of the main drive pulse P1 has a margin, a detection section for detecting the rotation of a stepping motor is divided into a plurality of sections by a predetermined reference time, the degree of the drive margin of the main drive pulse P1 is determined on the basis of a section in which an induced signal VRs exceeding a predetermined reference threshold voltage generated by the free vibration of the stepping motor is detected, and driving is performed by a change to the main drive pulse P1 depending on the degree of the drive margin (see, for example, International Publication No. WO 2005/119377 and JP-A-2010-166798).

In the drive systems disclosed in International Publication No. WO 2005/119377 and JP-A-2010-166798, since the reference time for setting the section is constantly fixed, rank-up (excess rank-up) is performed when the detection time of the induced signal VRs becomes late in spite of the drive margin being present. For example, in a case where the moment of hands mounted to an analog electronic timepiece by a customer is larger than specified, or the like, the timing of the generation of an induced voltage occurring due to free vibration is delayed, and thus the induced signal VRs indicating that rank-up is required is generated. Excess rank-up may occur in spite of rank-up being unnecessary or rank-down being necessary. Due to the occurrence of excess rank-up, current consumption increases, and thus battery life deteriorates when a battery is used. Thereby, there occurs a problem in that battery life considerably fluctuates or deteriorates because of the moment of hands to be mounted.

SUMMARY OF THE INVENTION

It is an aspect of the present application to perform driving by a drive pulse having appropriate drive energy and suppress the dissipation of energy, by accurately detecting the degree of the margin of drive energy even when a load is large.

According to the application, there is provided a stepping motor control circuit including: a rotation detection unit that detects a induced signal exceeding a predetermined reference threshold value which is generated by a stepping motor in a detection section divided into at least three sections, and detects a rotation state on the basis of a pattern indicating whether the induced signal exceeding a reference threshold value is detected in each of the sections; and a control unit that selects a main drive pulse depending on the rotation state detected by the rotation detection unit from a plurality of main drive pulses which are different from each other in energy, and drives the stepping motor, wherein when the induced signal exceeding a reference threshold value is not detected in a first section which is an initial section out of the plurality of sections, the rotation detection unit detects the induced signal by shifting an end position of at least one section other than the initial section to a rear side by a predetermined amount.

According to the application, there is provided a movement including the stepping motor control circuit.

According to the application, there is provided an analog electronic timepiece including the movement.

According to the stepping motor control circuit of the application, it is possible to perform driving by a drive pulse having appropriate drive energy and suppress the dissipation of energy, by accurately detecting the degree of the margin of drive energy even when a load is large.

According to the movement of the application, it is possible to produce an analog electronic timepiece capable of performing driving by a drive pulse having appropriate drive energy and suppressing the dissipation of energy, by accurately detecting the degree of the margin of drive energy even when a load is large.

According to the analog electronic timepiece of the application, it is possible to perform driving by a drive pulse having appropriate drive energy and suppress the dissipation of energy, by accurately detecting the degree of the margin of drive energy even when a load is large.

BRIEF DESCRIPTION OF THE DRAWINGS

FIG. 3 is a timing diagram illustrating operations of a first embodiment of the invention.

FIG. 4 is a determination chart illustrating operations of first and second embodiments of the invention.

FIG. 6 is a timing diagram illustrating the operations of the second embodiment of the invention.

FIG. 8 is a timing diagram illustrating operations of a third embodiment of the invention.

FIG. 9 is a determination chart illustrating the operations of the third embodiment of the invention.

FIG. 12 is a timing diagram illustrating operations of a fifth embodiment of the invention.

FIG. 13 is a timing diagram illustrating the operations of the fifth embodiment of the invention.

FIG. 14 is a timing diagram illustrating the operations of the fifth embodiment of the invention.

FIG. 15 is a determination chart illustrating the operations of the fifth embodiment of the invention.

DETAILED DESCRIPTION OF THE INVENTION

Figure 1:
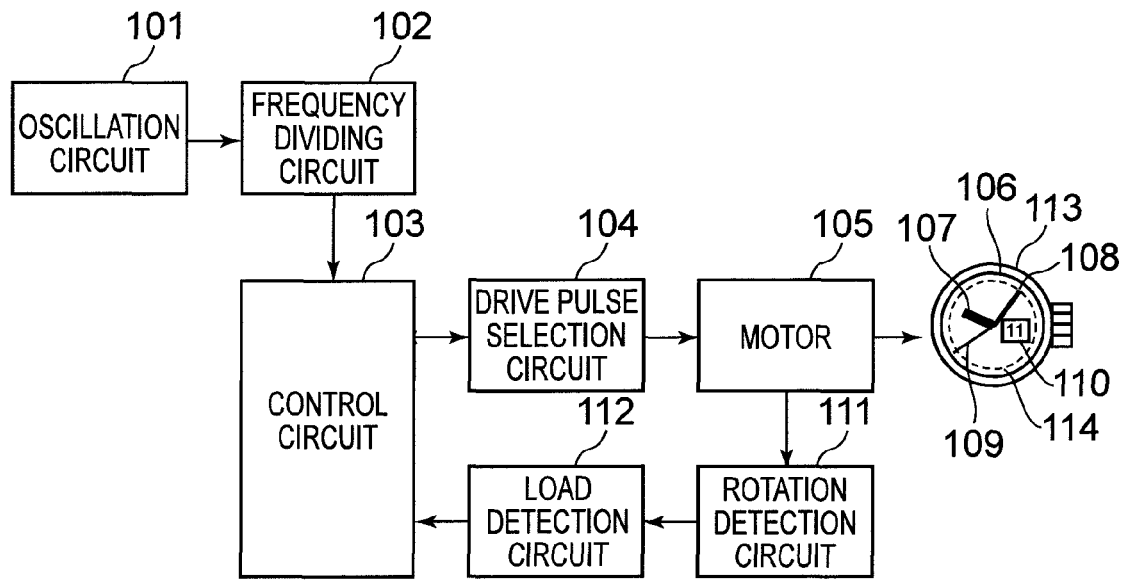
FIG. 1 is a block diagram which is common to a stepping motor control circuit, a movement and an analog electronic timepiece according to each embodiment of the invention.

FIG. 1 is a block diagram which is common to a stepping motor control circuit, a movement including the stepping motor control circuit, and an analog electronic timepiece including the movement according to each embodiment of the invention, and shows an example of an analog electronic wristwatch.

In FIG. 1, the analog electronic timepiece includes an oscillation circuit 101 that generates a signal of a predetermined frequency, a frequency dividing circuit 102 that divides the frequency of the signal generated by the oscillation circuit 101 to generate a clocking-based timepiece signal, a control circuit 103 that performs control of each electronic circuit element constituting the analog electronic timepiece, control of changing a drive pulse, and the like, a drive pulse selection circuit 104 that selects and outputs a drive pulse for rotationally driving a motor on the basis of a control signal from the control circuit 103, a stepping motor 105 which is rotationally driven by a drive pulse from the drive pulse selection circuit 104, and an analog display unit 106 having time indicating hands (three types of an hour hand 107, a minute hand 108, and a second hand 109 in the example of FIG. 1), rotationally driven by the stepping motor 105, for displaying a time of day and a calendar display unit 110 for displaying a date.

In addition, the analog electronic timepiece includes a timepiece case 113, and is configured such that the analog display unit 106 is disposed on the outside surface of the timepiece case 113, and a movement 114 is disposed inside the timepiece case 113.

In addition, the analog electronic timepiece includes a rotation detection circuit 111 that detects an induced signal VRs which is generated by the free vibration of the stepping motor 105 and indicates its rotation state, in a predetermined detection section T, and a load detection circuit 112 that compares a plurality of sections with the time at which the induced signal VRs exceeding a predetermined reference threshold voltage (reference threshold value) Vcomp is detected by the rotation detection circuit 111 to determine at which section the above induced signal VRs is detected, and outputs a detection signal indicating the rotation state of the stepping motor 105 such as the degree of the margin of drive energy of a drive pulse for the load or the presence or absence of rotation.

Meanwhile, in each embodiment of the invention, as described later, the detection section T for detecting whether the stepping motor 105 is rotated is divided into a plurality of sections.

The rotation detection circuit 111 is configured to detect the induced signal VRs using the same principle as that of the rotation detection circuit disclosed in International Publication No. WO 2005/119377 mentioned above. When a rotation operation exceeds a constant speed as in the case where the stepping motor 105 is rotated or the like, the induced signal VRs exceeding the predetermined reference threshold voltage Vcomp is generated, and when the rotation operation has a constant speed or lower as in the case where the motor 105 is not rotated or the like, the reference threshold voltage Vcomp is set so that the induced signal VRs does not exceed the reference threshold voltage Vcomp.

When the induced signal VRs exceeding the reference threshold voltage Vcomp is not detected at an initial section in the plurality of sections, the load detection circuit 112 shifts an end position of at least one section other than the initial section to the rear side by a predetermined amount, and determines a section at which the induced signal exceeding the reference threshold voltage Vcomp is detected.

The oscillation circuit 101, the frequency dividing circuit 102, the control circuit 103, the drive pulse selection circuit 104, the stepping motor 105, the rotation detection circuit 111 and the load detection circuit 112 are components of the movement 114.

Generally, a mechanical system of a timepiece constituted by devices such as a power source of the timepiece and a time reference is referred to as a movement. An electronic system is sometimes called a module. In a completed state as the timepiece, the movement is provided with a letter plate and hands, and is accommodated in the timepiece case.

Here, the oscillation circuit 101 and the frequency dividing circuit 102 constitute a signal generation unit, and the analog display unit 106 constitutes a time-of-day display unit. The rotation detection circuit 111 and the load detection circuit 112 constitute a rotation detection unit. The control circuit 103 and the drive pulse selection circuit 104 constitute a control unit. In addition, the oscillation circuit 101, the frequency dividing circuit 102, the control circuit 103, the drive pulse selection circuit 104, the rotation detection circuit 111 and the load detection circuit 112 constitute a stepping motor control circuit.

Figure 2:
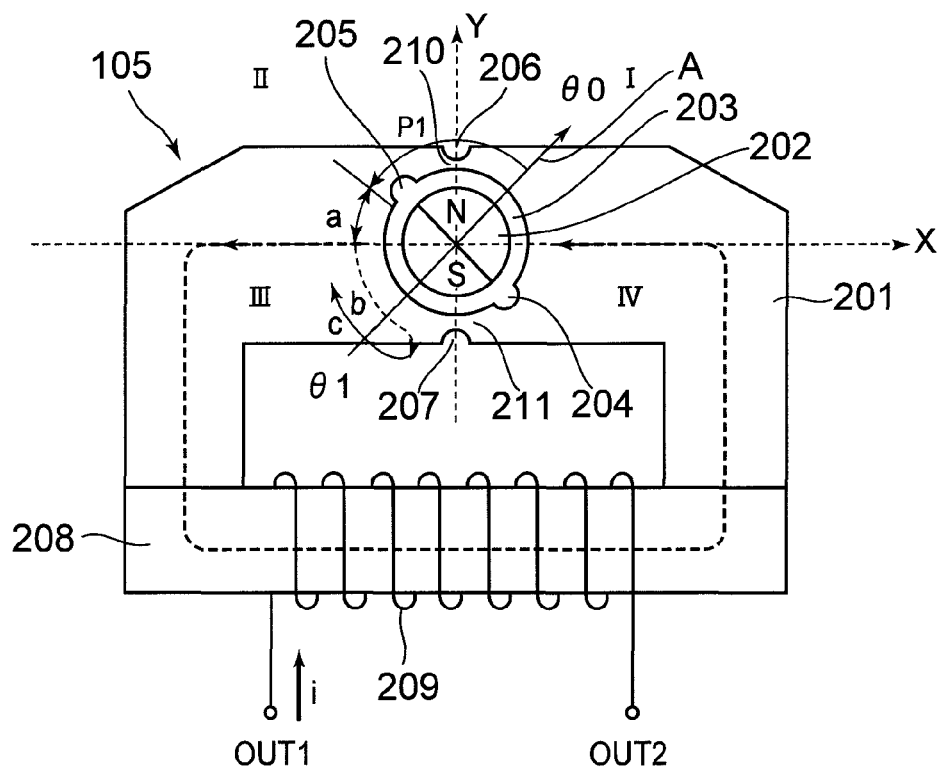
FIG. 2 is a configuration diagram of a stepping motor used in each embodiment of the invention.

FIG. 2 is a configuration diagram of the stepping motor 105 used in each embodiment of the invention, and shows an example of a stepping motor for a timepiece which is generally used in an analog electronic timepiece.

In FIG. 2, the stepping motor 105 includes a stator 201 having a rotor accommodating through hole 203, a rotor 202 which is rotatably disposed in the rotor accommodating through hole 203, a magnetic core 208 which is joined to the stator 201, and a coil 209 which is wound around the magnetic core 208. When the stepping motor 105 is used in the analog electronic timepiece, the stator 201 and the magnetic core 208 are fixed to a ground plate (not shown) by screws (not shown), and are joined to each other. The coil 209 includes a first terminal OUT1 and a second terminal OUT2.

The rotor 202 is magnetized to two poles (S pole and N pole). On the external end of the stator 201 formed of a magnetic material, a plurality of (two in the example of FIG. 2) notched portions (outer notches) 206 and 207 are provided at positions that face each other with the rotor accommodating through hole 203 interposed therebetween. Saturable portions 210 and 211 are provided between each of the outer notches 206 and 207 and the rotor accommodating through hole 203.

The saturable portions 210 and 211 are configured not to be magnetically saturated with a magnetic flux of the rotor 202, but to be magnetically saturated when the coil 209 is excited so as to increase the magnetic resistance thereof. The rotor accommodating through hole 203 is formed in a circular hole shape in which a plurality of (two in the example of FIG. 2) semilunar notched portions (inner notches) 204 and 205 are integrally formed at facing portions of a through hole having a circular profile.

The notched portions 204 and 205 constitute a positioning portion for determining a stop position of the rotor 202. In a state where the coil 209 is not excited, as shown in FIG. 2, the rotor 202 is stably stopped at a position corresponding to the positioning portion, in other words, a position (position of angle θ0) where a magnetic pole axis A of the rotor 202 is orthogonal to a line segment which connects the notched portions 204 and 205. An XY coordinate space centering on the rotation axis (center of rotation) of the rotor 202 is divided into four quadrants (first quadrant I to fourth quadrant IV).

When a square-wave drive pulse is supplied between the terminals OUT1 and OUT2 of the coil 209 from the drive pulse selection circuit 104 (for example, using the first terminal OUT1 side as a positive pole, and the second terminal OUT2 side as a negative pole) to cause a current I to flow in the direction of an arrow shown in FIG. 2, a magnetic flux is generated in the stator 201 in the direction of a broken-line arrow.

Thereby, the saturable portions 210 and 211 become saturated and thus the magnetic resistance increases. Thereafter, due to an interaction between a magnetic pole generated in the stator 201 and a magnetic pole of the rotor 202, the rotor 202 is rotated 180 degrees in the direction of an arrow shown in FIG. 2, and is stably stopped at a position where the magnetic pole axis forms an angle θ1.

Meanwhile, a rotational direction (counterclockwise direction in FIG. 2) for performing a normal operation (hand moving operation because of the use of the analog electronic timepiece in each embodiment of the invention) by rotationally driving the stepping motor 105 is set to a forward direction, and a direction (clockwise direction) opposite to the rotational direction is set to a backward direction.

Next, when a square-wave drive pulse having a reverse polarity is supplied to the terminals OUT1 and OUT2 of the coil 209 from the drive pulse selection circuit 104 (the first terminal OUT1 side is set to a negative pole and the second terminal OUT2 side is set to a positive pole so as to have a reverse polarity to the above-mentioned driving) to cause a current to flow in a direction opposite to the direction of an arrow shown in FIG. 2, a magnetic flux is generated in the stator 201 in a direction opposite to the direction of a broken-line arrow.

Thereby, the saturable portions 210 and 211 are first saturated. Thereafter, due to an interaction between a magnetic pole generated in the stator 201 and a magnetic pole of the rotor 202, the rotor 202 is rotated 180 degrees in the same direction (forward direction) as the above-mentioned direction, and is stably stopped at a position where the magnetic pole axis forms an angle θ0.

Hereinafter, in this manner, the above-mentioned operation is repeatedly performed by supplying signals (alternating signals) which are different from each other in polarity to the coil 209, thereby allowing the rotor 202 to be continuously rotated in the direction of an arrow every 180 degrees. Meanwhile, in each embodiment of the invention, as the drive pulses, a plurality of main drive pulses P11 to P1n which are different from each other in energy and a correction drive pulse P2 having larger energy than each of the main drive pulses P1 are used.

Basically, the control circuit 103 rotationally drives the stepping motor 105 by alternately driving the stepping motor by the main drive pulses P1 which are different from each other in polarity. When the stepping motor cannot be rotated by the main drive pulse P1, the stepping motor is rotationally driven by the correction drive pulse P2 having the same polarity as the main drive pulse P1.

FIG. 3 is a timing diagram when the stepping motor 105 is driven by the main drive pulse P1 in the embodiment of the invention, and shows states indicating the margin of energy of the main drive pulse P1 for a load, rotation behaviors of the rotor 202, timings of the generation of the induced signal VRs, and patterns of the induced signal VRs indicating a rotation state (determination values of the induced signal VRs in sections T1 to T3).

In FIG. 3, P1 indicates a drive range of the main drive pulse P1 and indicates a range in which the rotor 202 is rotationally driven by the main drive pulse P1. In addition, a to e are regions indicating rotation positions of the rotor 202 by free vibration after a drive stop by the main drive pulse P1.

The detection section T for detecting the rotation state of the stepping motor after driving by the main drive pulse P1 is provided. The detection section T is divided into the section T1 (first section which is an initial section) to which an initial predetermined time is set, the section T2 (second section) to which a predetermined time coming after the section T1 is set, and the section T3 (third section) to which a predetermined time coming after the section T2 is set.

When the induced signal VRs is detected in the detection section T, the rotation detection circuit 111 is configured to detect the induced signal VRs by sampling the induced signal VRs with a predetermined sampling period. The detection section T is constituted by a plurality of sampling periods, and the induced signal VRs is detected at a plurality of points in time by sampling the induced signal VRs in each of the sampling periods.

In this manner, the entire detection section T which starts after driving by the main drive pulse P1 is divided into three or more sections (three sections (section T1, section T2, and section T3) in the present embodiment). Meanwhile, in the present embodiment, a section (mask section) in which the induced signal VRs after the driving by the main drive pulse P1 is not used in the determination of the rotation state is not provided.

When the XY coordinate space at which the main magnetic pole A of the rotor 202 is located due to the rotation of the rotor 202 is divided into the first quadrant I to the fourth quadrant IV centering on the rotor 202, the section T1, the section T2, and the section T3 can be expressed as follows, in accordance with the magnitude (energy margin) of the margin of energy of the main drive pulse P1 at the time of driving a normal load. The term "normal load" as used herein means a load which is driven in a normal time. In the present embodiment, a load when time indicating hands (hour hand 107, minute hand 108, and second hand 109) which are light and have predetermined weights are driven is set to the normal load.

In addition, in FIG. 3, the "state of normal hands and sufficient energy", the "state of slightly low energy", the "state of considerably low energy", and the "non-rotation state" to which the energy state corresponds are shown in the timing diagram when the time indicating hands are rotationally driven using time indicating hands (normal hands) which are light and have predetermined weights, and the "state of large mounted hands" to which the energy state corresponds is shown in the timing diagram when the time indicating hands are rotationally driven using time indicating hands which are heavier or larger in moment than the normal hands.

In the "state of slightly low energy" (state (rank maintenance) where the stepping motor 105 can be rotated even when the main drive pulse P1 is not changed without performing the rank-up or the rank-down of the main drive pulse P1, and state where the pattern (1, 1, 0/1) of the induced signal VRs is obtained) to which the energy state of the main drive pulse P1 for a load corresponds, the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial backward rotation of the rotor 202 in the third quadrant III.

Meanwhile, in the pattern of the induced signal VRs, a case where the induced signal VRs exceeding the predetermined reference threshold voltage Vcomp is detected is expressed as "1", a case where the induced signal VRs exceeding the predetermined reference threshold voltage Vcomp is not detected is expressed as "0", and "0/1" denotes that the induced signal VRs may exceed or not exceed the predetermined reference threshold voltage Vcomp.

In the "state of considerably low energy" (state where the stepping motor 105 can be rotated, but the rank-up of the main drive pulse P1 is required in order to stably rotate the stepping motor 105, and state where an induced signal pattern (1, 0, 1) is obtained) where the energy state is reduced by a predetermined amount to more than that in the "state of slightly low energy", the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial forward rotation state and an initial backward rotation of the rotor 202 in the third quadrant III.

When the energy of the main drive pulse for a load has the possibility of the mounted hands being large and the energy state being sufficient, that is, when the section T1 is set to "0", an end position Tcomp of the section T2 is shifted to the rear side (the section T3 side) by a predetermined amount, and the width of the section T2 is increased by a predetermined amount to more than that in each of the states such as the "state of slightly low energy", so that the rotation state is detected.

That is, in the "state of normal hands and sufficient energy" (state where the stepping motor 105 can be rotated even when the main drive pulse P1 is changed (ranked down) to the main drive pulse P1 having energy smaller by one rank, and state where an induced signal pattern (0, 1, 0) is obtained), the "state of large mounted hands and sufficient energy" (state where the stepping motor 105 can be rotated even when the main drive pulse P1 is ranked down to the main drive pulse P1 having energy smaller by one rank, and state where the induced signal pattern (0, 1, 0) is obtained), and the "state of considerably low energy" (state where the main drive pulse P1 is required to be ranked up by one because the stepping motor can be rotated in this time's driving but has the possibility of not being able to be rotated, and state where an induced signal pattern (0, 0, 1) is obtained) to which the energy state of the main drive pulse for a load corresponds, the width of the detection section T (section obtained by adding up the sections T1, T2, and T3) is the same as that of each of the states such as the "state of slightly low energy" mentioned above, but the end position Tcomp of the section T2 is shifted further to the rear side by a predetermined amount than for the section T2 used at the time of these states, so that the rotation state is detected.

Meanwhile, the width of the detection section T is not necessarily maintained constant, but the width when the end position Tcomp of the section T2 is shifted by a predetermined amount and the width when the end position is not shifted by a predetermined amount may be changed.

In the state of lowest energy (state where the induced signal pattern (0, 0, 1) is obtained) in the "state of considerably low energy" to which the energy state corresponds, the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial forward rotation state and an initial backward rotation of the rotor 202 in the third quadrant III.

On the other hand, in the "state of normal hands and sufficient energy" to which the energy state of the main drive pulse P1 for a load corresponds, the section T1 is a section for determining an initial forward rotation state of the rotor 202 in the third quadrant III of a space centering on the rotor 202, and the section T2 is a section for determining a rotation state after the initial forward rotation state and an initial backward rotation of the rotor 202 in the third quadrant III, and the section T3 is a section for determining a rotation state after the initial backward rotation of the rotor 202 in the third quadrant III.

In the "state of large mounted hands and sufficient energy" where the energy of the main drive pulse for a load is smaller by a predetermined amount than the "normal hands and sufficient energy", the section T1 is a section for determining an initial forward rotation state of the rotor 202 in the third quadrant III of a space centering on the rotor 202, the section T2 is a section for determining rotation states of an initial forward rotation state and an initial backward rotation of the rotor 202 in the third quadrant III, and the section T3 is a section for determining a rotation state of the initial backward rotation of the rotor 202 in the third quadrant III.

Vcomp is a reference threshold voltage for determining a voltage level of the induced signal VRs generated in the stepping motor 105, and the reference threshold voltage Vcomp is set so that the induced signal VRs exceeds the reference threshold voltage Vcomp when the rotor 202 performs a rapid operation exceeding a predetermined speed as in the case where the stepping motor 105 is rotated or the like, and that the induced signal VRs does not exceed the reference threshold voltage Vcomp when the rotor 202 does not perform a rapid operation exceeding a predetermined speed as in the case where the stepping motor is not rotated or the like.

FIG. 4 is a determination chart illustrating operations of a first embodiment of the invention collectively before and after the end position Tcomp of the section T2 is changed. In FIG. 4, as mentioned above, the case where the induced signal VRs exceeding the reference threshold voltage Vcomp is detected is expressed as a determination value "1", and the induced signal VRs exceeding the reference threshold voltage Vcomp cannot be detected is expressed as a determination value "0". In addition, "0/1" denotes that the determination value may be "1" or "0".

As shown in FIG. 4, referring to the determination chart of FIG. 4 which is stored in the control circuit 103 on the basis of the pattern in which the rotation detection circuit 111 detects the presence or absence of the induced signal VRs exceeding the reference threshold voltage Vcomp, and the load detection circuit 112 determines the detection time (section) of the induced signal VRs, the control circuit 103 and the drive pulse selection circuit 104 control the rotation of the stepping motor 105 by performing pulse control such as the rank-up and the rank-down of the main drive pulse P1 or driving by the correction drive pulse P2.

For example, in a case of a pattern (0/1, 0, 0), the control circuit 103 determines that the stepping motor 105 is not rotated (non-rotated), and controls the drive pulse selection circuit 104 so as to drive the stepping motor 105 by the correction drive pulse P2, and then controls the drive pulse selection circuit 104 so as to drive the stepping motor by performing rank-up to the main drive pulse P1 one rank above at the time of the next-time driving.

In a case of a pattern (0, 1, 0/1), the control circuit 103 determines a rotation in the state of normal hands and sufficient energy, and performs pulse control so as to rank down the drive energy of the main drive pulse P1 when this state is continuously performed a predetermined number of times (N times).

As shown in "before change" of FIG. 4, when the width of the section T2 is not changed even in the case where the section T1 is set to "0", the "state of large mounted hands and sufficient energy" or the "state of considerably low energy" cannot be determined when the pattern (0, 0, 1) is obtained. However, as shown in "after change" of FIG. 4 in the present embodiment, by changing the end position Tcomp of the section T2 when the section T1 is set to "0", the pattern (0, 1, 0) is obtained in the case of the "state of large mounted hands and sufficient energy", and the pattern (0, 0, 1) is obtained in the case of the "state of considerably low energy". Therefore, rotational driving using the appropriate main drive pulse P1 is performed.

Figure 5:
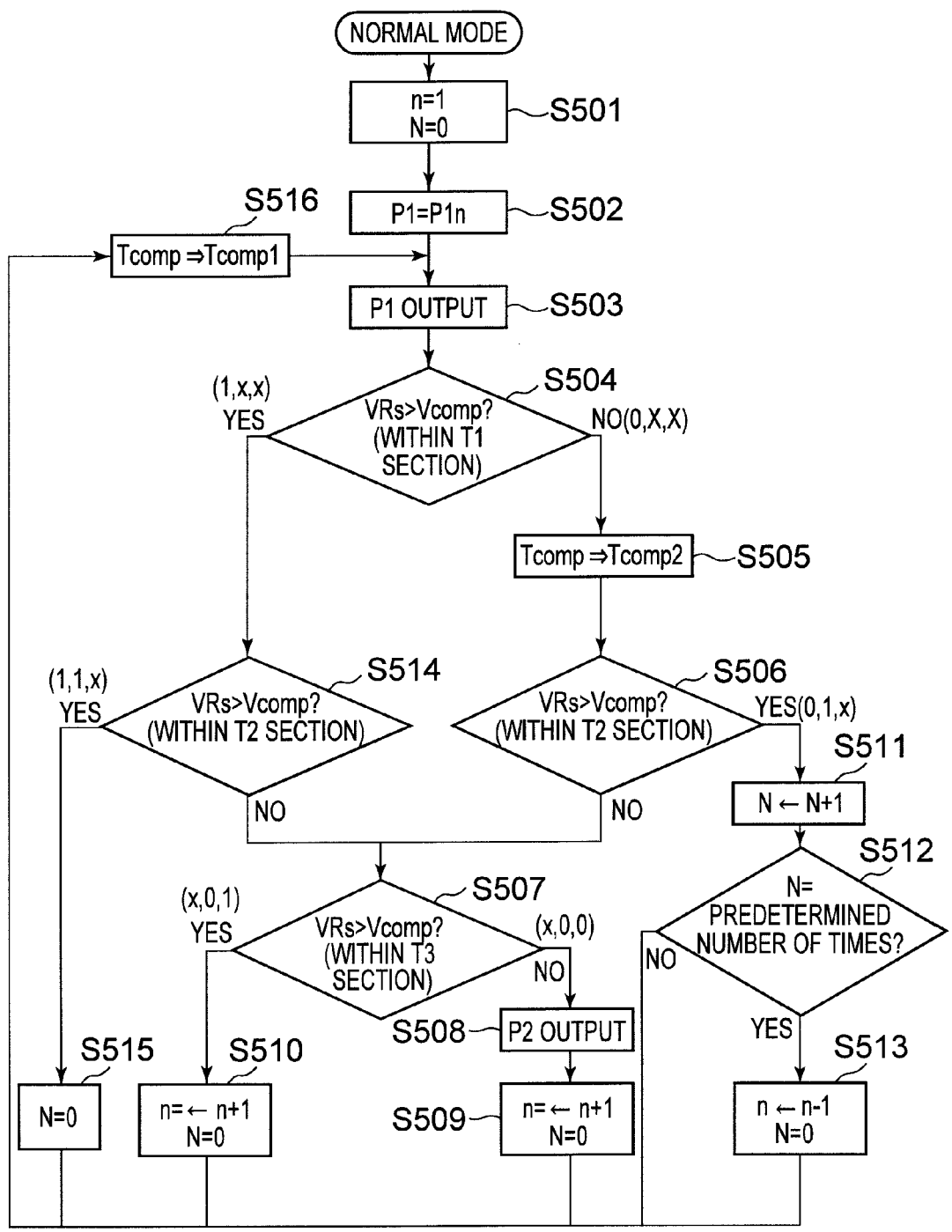
FIG. 5 is a flow chart illustrating the operations of the first embodiment of the invention.

FIG. 5 is a flow chart illustrating the operations of the first embodiment of the invention, and is a flow chart mainly illustrating processes of the control circuit 103.

Hereinafter, the operations of the embodiment of the invention will be described in detail with reference to FIGS. 1 to 5.

In FIG. 1, the oscillation circuit 101 generates a reference clock signal of a predetermined frequency, and the frequency dividing circuit 102 divides the frequency of the above-mentioned signal generated in the oscillation circuit 101 to generate a clocking-based timepiece signal, and outputs the timepiece signal to the control circuit 103.

The control circuit 103 outputs a control signal so as to rotationally drive the stepping motor 105 by the main drive pulse P11 having a minimum pulse width (step S502, S503) by counting the above-mentioned timepiece signal to perform a clocking operation, by first setting an energy rank n of the main drive pulse P1n to 1 and setting the number of times N to 0 (step S501 of FIG. 5). When the stepping motor is reliably attempted to be brought into operation at the time of start-up, the energy rank at the time of start-up may be set to a pulse having larger energy than that of P11, but is set to P11 in the present embodiment.

The drive pulse selection circuit 104 selects the main drive pulse P11 corresponding to the control signal from the control circuit 103, and rotationally drives the stepping motor 105. The stepping motor 105 is rotationally driven by the main drive pulse P11, and rotationally drives the time indicating hands 107 to 109 (calendar display unit 110 when the date is changed). Thereby, when the stepping motor 105 is normally rotated, the current time of day is displayed on the display unit 106 by the time indicating hands 107 to 109. In addition, today's date is displayed by the calendar display unit 110.

In the detection section T after driving by the main drive pulse P11, the rotation detection circuit 111 detects the induced signal VRs of the stepping motor 105 exceeding the predetermined reference threshold voltage Vcomp. In addition, the load detection circuit 112 outputs a detection signal, indicating a determination result of whether the detection time t of the induced signal VRs is determined to be within the section T1 (that is, determination result of whether the induced signal VRs exceeding the reference threshold voltage Vcomp is detected within the section T1), to the control circuit 103. The control circuit 103 determines whether the induced signal VRs exceeding the reference threshold voltage Vcomp is detected within the section T1 on the basis of the detection signal from the load detection circuit 112 (step S504).

When it is determined that the induced signal VRs exceeding the reference threshold voltage Vcomp is not detected within the section T1 in processing step S504 (when a pattern corresponds to (0, x, x); however, a determination value "x" means that it does not matter whether the determination value is "1" or "0"), the load detection circuit 112 shifts the end position Tcomp of the section T2 by a predetermined amount from an end position (first end position) Tcomp1 to an end position (second end position) Tcomp2 located at the rear side (section T3 side), and increases the width of the section T2 (step S505).

Meanwhile, the section change of the load detection circuit 112 may be performed by the load detection circuit 112 itself, and the control circuit 103 may perform control so as to change the section of the load detection circuit 112. In the latter case, a rotation detection unit is formed including a control function of changing the section of the load detection circuit 112 included in the control circuit 103.

The width of the detection section T is not required to be maintained constant, but the width of the detection section T is set to be a constant value in the present embodiment, and thus the width of the section T3 is reduced with an increase in the width of the section T2.

It is possible to appropriately set which position the second end position Tcomp2 of the section T2 is set to, in accordance with the weight or the like of the time indicating hands to be used. For example, it is possible to shift the end position Tcomp up to a 1/2 position of the original section T3.

In addition, as the second section, a plurality of sections having the different section end positions Tcomp may be prepared, and an appropriate section is selected and used in accordance with the weight or the like of the time indicating hands to be used, thereby allowing the rotation state to be detected by shifting the section end position Tcomp to the rear side by a predetermined amount.

In the section (new section) T2 obtained by shifting the end position Tcomp by a predetermined amount as mentioned above, the control circuit 103 determines whether the rotation detection circuit 111 and the load detection circuit 112 detect the induced signal VRs exceeding the reference threshold voltage Vcomp (step S506).

When it is determined that the induced signal VRs exceeding the reference threshold voltage Vcomp is not detected within the new section T2 in processing step S506 (when the pattern corresponds to (0, 0, x)), the control circuit 103 determines whether the induced signal VRs exceeding the reference threshold voltage Vcomp is detected within the section T3 obtained by reducing the width thereof as mentioned above (step S507).

When it is determined that the induced signal VRs exceeding the reference threshold voltage Vcomp is not detected within the section T3 in processing step S507 (when the pattern corresponds to (x, 0, 0) and non-rotation), the control circuit 103 forces the stepping motor 105 to be rotated by the correction drive pulse P2 having the same polarity as that of the main drive pulse P1 in processing step S503 (step S508), and then ranks up the rank n of the main drive pulse P1 by one to change the ranked-up pulse to a main drive pulse P1 (n+1) (step S509).

After the load detection circuit 112 returns the end position Tcomp of the section T2 to the first end position Tcomp1, the process returns to processing step S503 (step S516). Thereby, each of the sections T1 to T3 of the detection section T returns to an initialized position and width.

The next-time driving is performed by the main drive pulse P1 (n+1) which is set as mentioned above, and a rotation detection operation is started in a state where the end position Tcomp of the section T2 is set to the first end position Tcomp1.

When it is determined that the induced signal VRs exceeding the reference threshold voltage Vcomp is detected within the section T3 (when the pattern corresponds to (x, 0, 1)) in processing step S507, the control circuit 103 ranks up the main drive pulse P1 by one, without performing driving by the correction drive pulse P2, to change the ranked-up pulse to the main drive pulse P1 (n+1), and resets the number of times N to 0 (step S510). Thereafter, the process returns to processing step S503 through processing step S516. The next-time driving is performed by the main drive pulse P1 (n+1) which is set as mentioned above, and the rotation detection operation is started in a state where the sections T1 to T3 are initialized as mentioned above.

When it is determined that the induced signal VRs exceeding the reference threshold voltage Vcomp is detected within the section T2 in processing step S506 (when the pattern corresponds to (0, 1, x)), the control circuit 103 adds 1 to the number of times N (step S511), and then determines whether the number of times N becomes a predetermined number of times (step S512).

Returning to processing step S503 through processing step S516 when the number of times N does not become a predetermined number of times in processing step S512, the control circuit 103 ranks down the main drive pulse P1 by one when it is determined that the number of times N becomes a predetermined number of times to change the ranked-up pulse to a main drive pulse P1 (n−1), and resets the number of times N to 0 (step S513). Thereafter, the process returns to processing step S503 through processing step S516. The next-time driving is performed by the main drive pulse P1 (n−1) which is as mentioned above, and the rotation detection operation is started in a state where the sections T1 to T3 are initialized as mentioned above.

On the other hand, when it is determined that the induced signal VRs exceeding the reference threshold voltage Vcomp is detected within the section T1 in processing step S504 (when the pattern corresponds to (1, x, x)), the load detection circuit 112 determines whether the induced signal VRs exceeding the reference threshold voltage Vcomp is detected within the section T2 without changing the end position Tcomp of the section T2. When it is determined that the induced signal VRs exceeding the reference threshold voltage Vcomp is detected within the section T1 in processing step S504, the control circuit 103 determines whether the rotation detection circuit 111 and the load detection circuit 112 detect the induced signal VRs exceeding the reference threshold voltage Vcomp within the section T2 (step S514).

When it is determined that the induced signal VRs exceeding the reference threshold voltage Vcomp is not detected within the section T2 (when the pattern corresponds to (1, 0, x)) in processing step S514, the control circuit 103 performs processing step S507, and determines whether the induced signal VRs exceeding the reference threshold voltage Vcomp is detected within the section T3 having no change.

When it is determined that the induced signal VRs exceeding the reference threshold voltage Vcomp is detected within the section T2 in processing step S514 (when the pattern corresponds to (1, 1, x)), the control circuit 103 resets the number of times N to 0 (step S515). Thereafter, the process returns to processing step S503 through processing step S516.

As described above, the stepping motor control circuit according to the first embodiment of the invention includes a rotation detection unit that detects the induced signal VRs exceeding the predetermined reference threshold voltage Vcomp generated by the stepping motor 105 in the detection section T divided into at least three sections T1, T2, and T3, and detects a rotation state on the basis of a pattern indicating whether the induced signal VRs exceeding the reference threshold voltage Vcomp is detected in each of the sections T1, T2, and T3, and a control unit that selects the main drive pulse P1 depending on the rotation state detected by the rotation detection unit from a plurality of main drive pulses P1 which are different from each other in energy, and drives the stepping motor 105. When the induced signal VRs exceeding the reference threshold voltage Vcomp is not detected in the first section T1 which is an initial section out of the plurality of sections T1, T2, and T3, the rotation detection unit detects the induced signal by shifting the end position Tcomp of at least one of the sections T2 and T3 other than the initial section T1 to the rear side by a predetermined amount.

Here, the detection section T is divided into the first section T1 after driving by the main drive pulse P1, the second section T2 coming after the first section T1, and the third section T3 coming after the second section T2. In the state of slightly low energy where the rank n of the main drive pulse P1 is not changed, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III. When the induced signal VRs exceeding the reference threshold voltage Vcomp is not detected in the first section T1, the rotation detection unit can be configured to detect the induced signal by shifting the end position Tcomp of the second section T2 further to the rear side by a predetermined amount than in a case where the induced signal VRs exceeding the reference threshold voltage Vcomp is detected.

In addition, when the induced signal VRs exceeding the reference threshold voltage Vcomp is not detected in the first section T1 every time the control unit drives the stepping motor 105 by the main drive pulse P1, the rotation detection unit can be configured to detect the induced signal by shifting the end position Tcomp of the second section T2 further to the rear side by a predetermined amount than in a case where the induced signal VRs exceeding the reference threshold voltage Vcomp is detected.

In addition, when the induced signal VRs exceeding the reference threshold voltage Vcomp is not detected in the first section T1, the rotation detection unit can be configured to detect the induced signal by increasing the width of the second section T2 by shifting the end position Tcomp of the second section T2 to the rear side by a predetermined amount and reducing the width of the third section T3 so that the width of the detection section T is not changed.

In addition, it can be configured that the end position Tcomp of the section T2 is set to the first end position Tcomp1 until the end position Tcomp of the section T2 is set to the second end position Tcomp2 in processing step S505, and that the end position Tcomp of the section T2 is fixed to the second end position Tcomp2 after the end position Tcomp of the section T2 is once set to the second end position Tcomp2 in processing step S505. In addition, it can be configured that every time the process of processing step S504 is performed, the end position Tcomp of the section T2 is returned to the first end position Tcomp1, and then the section of the induced signal VRs is determined.

Therefore, driving by a drive pulse having appropriate drive energy is performed by accurately detecting the degree of the margin of drive energy even when a load is large, thereby allowing the dissipation of energy to be suppressed.

In addition, it is possible to apply rank-up only to a case where the drive margin deteriorates, and to suppress power dissipation due to unnecessary rank-up.

In addition, even when a battery is used as a power supply, battery life is prevented from considerably fluctuating and deteriorating due to the moment of mounted hands, and thus it is possible to improve the limit value of the moment of mounted hands capable of satisfying target battery life, and to improve the additional value of products.

Next, a stepping motor control circuit, a movement and an analog electronic timepiece according to a second embodiment of the invention will be described.

In the above-mentioned embodiment, when the end position Tcomp of the section T2 is set to the second end position Tcomp2, and then the induced signal "1" is detected in the section T1, it can be configured that the end position Tcomp of the section T2 is returned to the first end position Tcomp1. In this case, when a pattern in which the drive margin deteriorates is obtained, the main drive pulse P1 may be ranked up immediately. For this reason, when large hands having a large weight are used as the time indicating hands 107 to 109, the rotation of the rotor 202 is slow and the generation of the induced signal VRs is delayed. Therefore, the pattern (1, 0, 1) is detected in spite of the energy being sufficient (unnecessary rank-up), and thus there is the possibility of rank-up being performed unnecessarily.

The second embodiment of the invention is contrived in order to solve such problems, and an object thereof is to suppress the dissipation of energy by not performing rank-up unnecessarily when the end position Tcomp is changed.

FIG. 6 is a timing diagram illustrating operations of the second embodiment of the invention, and the same portions as those in FIG. 3 are denoted by the same reference numerals and signs.

In FIG. 6, as is the case with FIG. 3, the detection section T is divided into a first section T1 after driving by the main drive pulse P1, a second section T2 coming after the first section T1, and a third section coming after the second section. In a state (rank maintenance state) where the rank of the main drive pulse P1 is not changed, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III.

Figure 7:
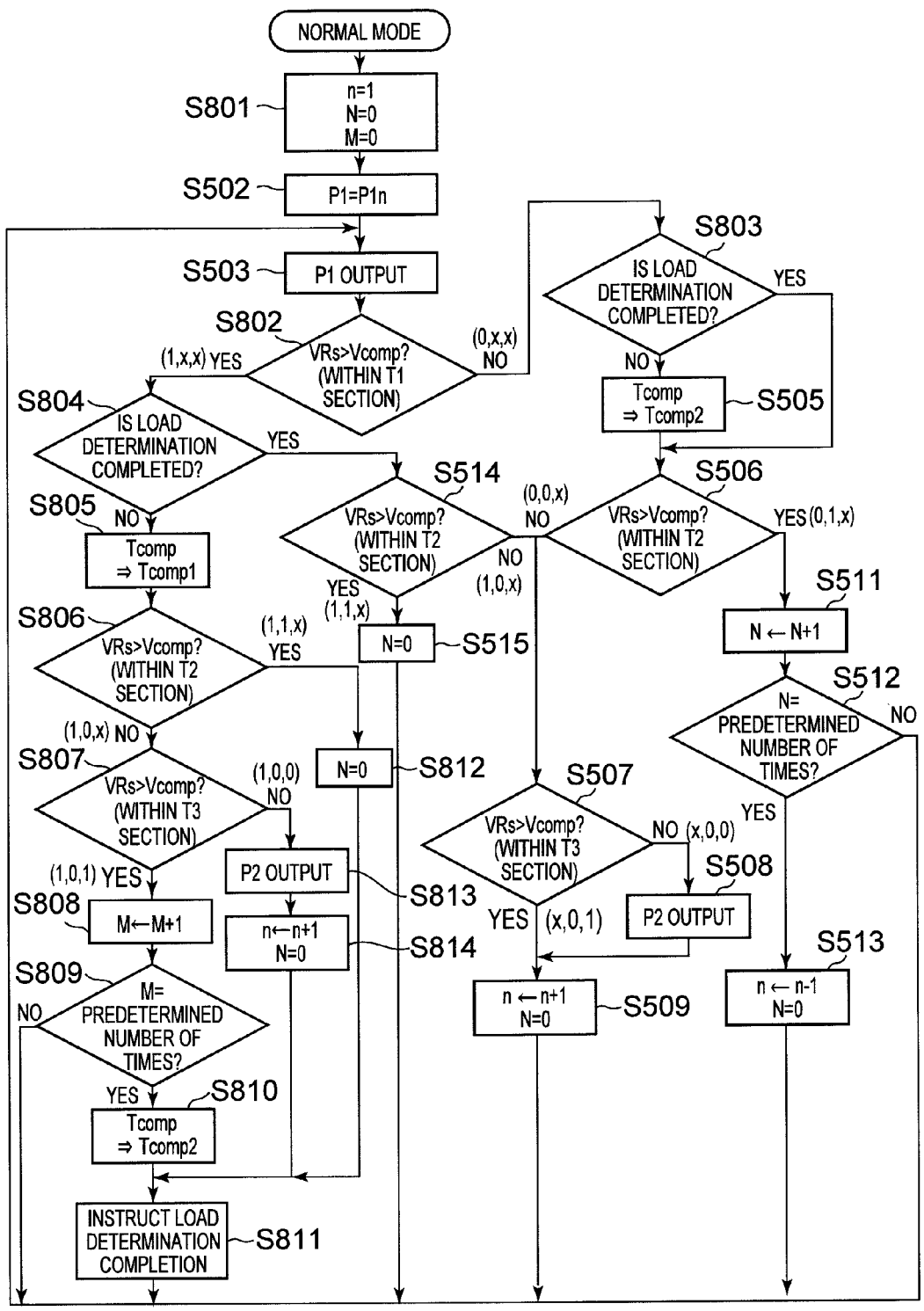
FIG. 7 is a flow chart illustrating the operations of the second embodiment of the invention.

In addition, FIG. 7 is a flow chart illustrating the operations of the second embodiment of the invention, and portions in which the same processes as those in FIG. 5 are performed are denoted by the same reference numerals and signs.

A block diagram, a configuration diagram of the stepping motor to be used, and a determination chart of the present embodiment are the same as those in FIGS. 1, 2, and 4, respectively.

Hereinafter, operations of the second embodiment of the invention with respect to portions which are different from those of the above-mentioned embodiment will be described with reference to FIGS. 1, 2, 4, 6, and 7.

The control circuit 103 outputs a control signal so as to rotationally drive the stepping motor 105 by the main drive pulse P11 having a minimum pulse width (steps S502 and S503), by counting a timepiece signal to perform a clocking operation, by first setting the energy rank n of the main drive pulse P1 to 1, setting the number of times N of continuous driving by the main drive pulse having the same energy to 0, and resetting a load determination count value M, which is a count value of the number of times that a predetermined pattern (pattern (1, 0, 1) in the present embodiment) is continuously detected, to 0 (step S801 of FIG. 7).

The drive pulse selection circuit 104 selects the main drive pulse P11 corresponding to the control signal from the control circuit 103, and rotationally drives the stepping motor 105. The stepping motor 105 is rotationally driven by the main drive pulse P11, and rotationally drives the time indicating hands 107 to 109 (calendar display unit 110 when the date is changed). Thereby, when the stepping motor 105 is normally rotated, the current time of day is displayed on the display unit 106 by the time indicating hands 107 to 109. In addition, today's date is displayed by the calendar display unit 110.

In the detection section T after driving by the main drive pulse P11, the rotation detection circuit 111 detects the induced signal VRs of the stepping motor 105 exceeding the predetermined reference threshold voltage Vcomp. In addition, the load detection circuit 112 outputs a detection signal, indicating a determination result of whether the detection time t of the induced signal VRs is determined to be within the section T1 (that is, determination result of whether the induced signal VRs exceeding the reference threshold voltage Vcomp is detected within the section T1), to the control circuit 103. The control circuit 103 determines whether the induced signal VRs exceeding the reference threshold voltage Vcomp is detected within the section T1 on the basis of the detection signal from the load detection circuit 112 (step S802).

When it is determined that the induced signal VRs exceeding the reference threshold voltage Vcomp is not detected within the section T1 in processing step S802 (when the pattern corresponds to (0, x, x)), the load detection circuit 112 determines whether to terminate a load determination (in the present embodiment, whether to terminate a determination of whether the time indicating hands 107 to 109 are normal hands (hands of the average load amount on specifications) or large hands (hands of the load amount exceeding an upper limit on specifications)) (step S803).

The load detection circuit 112 performs processing step S506 immediately when it is determined that the load determination (determination of whether the load is normal hands or large hands) is terminated in processing step S803, sets the end position Tcomp of the section T2 to the second end position Tcomp2 when it is determined that the load determination is not terminated and increases the width of the section T2 (step S505), and then performs processing step S506. Thereafter, the control circuit 103 performs a pattern determination or a pulse control operation as is the case with the above-mentioned embodiment, and then the process returns to step S503 (step S506 to S509, S511 to S513).

Meanwhile, as is the case with the above-mentioned embodiment, the section change of the load detection circuit 112 may be performed by the load detection circuit 112 itself, and the control circuit 103 may perform control so as to change the section of the load detection circuit 112.

In this manner, it is determined whether the load determination is previously terminated in processing step S803, and when the load determination is terminated, the end position Tcomp which is set at the time of the load determination is used as the end position Tcomp of the section T2. When the load determination is not yet terminated, the end position Tcomp of the section T2 is shifted to the second end position Tcomp2 by a predetermined amount through processing step S505. Meanwhile, the magnitude relation between the times of the end positions Tcomp1 and Tcomp2 is Tcomp1<Tcomp2 as described in the above-mentioned embodiment.

In FIG. 6, in the case of the state of normal hands and sufficient energy, the induced signal VRs exceeding the reference threshold voltage Vcomp is generated only within the section T2. Therefore, the pattern of the induced signal VRs becomes (0, 1, 0) and the number of times N increases, thereby allowing the main drive pulse P1 to be ranked down.

On the other hand, in FIG. 6, in the case of the state of large hands and sufficient energy, the time of occurrence of the induced signal VRs exceeding the reference threshold voltage Vcomp is delayed as compared to the case of the case of normal hands and sufficient energy. This is because the rotational speed of the rotor 202 slows down due to the large load amount, and the generation of the induced signal VRs is delayed.

In this case, in a state where the end position Tcomp of the section T2 is not changed and is located at the first end position Tcomp1, the pattern of the induced signal VRs becomes (0, 0, 1), and thus power consumption is dissipated due to rank-up.

However, in the present embodiment, since the end position Tcomp of the section T2 is set to the second end position Tcomp2 and a later time in processing step S505, the pattern of the induced signal VRs becomes (0, 1, 0) and the number of times N increases, thereby allowing the main drive pulse P1 to be ranked down.

When it is determined that the induced signal VRs exceeding the reference threshold voltage Vcomp is detected within the section T1 in processing step S802 (when the energy of the main drive pulse P1 deteriorates slightly, and the pattern corresponds to (1, x, x)), the load detection circuit 112 determines whether the load determination is terminated (step S804).

When it is determined that the load determination is terminated in processing step S804, the end position Tcomp of the section T2 is previously set to the end position Tcomp1 or Tcomp2, and thus the load detection circuit 112 performs processing step S514. Thereafter, the control circuit 103 performs a pattern determination or a pulse control operation as is the case with the above-mentioned embodiment (steps S514, S515, and S507 to S509).

When it is determined that the load determination is not terminated in processing step S804, the load detection circuit 112 returns the end position Tcomp of the section T2 to the first end position Tcomp1 (step S805).

In FIG. 6, in the state 2 of normal hands and slightly low energy, the pattern of the induced signal VRs becomes (1, 1, 0), and the rank of the main drive pulse P1 is maintained.

In the state of large mounted hands and slightly low energy 1, the rotational speed of the rotor 202 is slower than that of the normal hands due to the large mounted hands in the section T2 and the section T3 separated by the first end position Tcomp1, and the induced signal VRs exceeding the reference threshold voltage Vcomp appearing in the section T2 is generated in the section T3 in the normal hands. In this case, the pattern (1, 0, 1) is obtained and rank-up is performed. As seen from the above, in processing step S802, when the energy deteriorates slightly and the determination value "1" is obtained in the section T1, in the case where the mounted hands are large hands, rank maintenance is not performed, but rank-up is performed immediately, and thus power is dissipated. In order to prevent this, the following processes are performed.

The control circuit 103 determines the induced signal VRs exceeding the reference threshold voltage Vcomp is detected within the section T2 (step S806).

When it is determined that the induced signal VRs exceeding the reference threshold voltage Vcomp is detected within the section T2 in processing step S806 (when the pattern corresponds to (1, 1, x)), the control circuit 103 resets the number of times N to 0 (step S812), and then returns to processing step S503 by performing an instruction indicating that the load determination is terminated (for example, by establishing a flag indicating that the load determination is terminated) (step S811). In this manner, the load is determined to be normal hands by the pattern of the induced signal VRs when the process goes through processing step S812, and the end position Tcomp of the section T2 is set to the first end position Tcomp1.

When it is determined that the induced signal VRs exceeding the reference threshold voltage Vcomp is not detected within the section T2 in processing step S806 (when the pattern corresponds to (1, 0, x)), the control circuit 103 determines whether the induced signal VRs exceeding the reference threshold voltage Vcomp is detected within the section T3 (step S807).

When it is determined that the induced signal VRs exceeding the reference threshold voltage Vcomp is not detected within the section T3 in processing step S807 (when the pattern corresponds to (1, 0, 0)), the control circuit 103 performs driving by the correction drive pulse P2 (step S813), then ranks up the main drive pulse P1 by one to set the ranked-up pulse to the main drive pulse P1 (n+1) and resets the number of times N to 0 (step S814), and then returns to processing step S503 by instructing load determination completion (step S811).

In this manner, the load is determined to be normal hands by the pattern of the induced signal VRs when the process goes through processing steps S813 and S814, and the end position Tcomp of the section T2 is set to the first end position Tcomp1.

When it is determined that the induced signal VRs exceeding the reference threshold voltage Vcomp is detected within the section T3 in processing step S807 (when the pattern corresponds to (1, 0, 1)), the control circuit 103 adds 1 to the load determination count value M (step S808), and then determines whether the load determination count value M reaches a predetermined value (step S809).

When the control circuit 103 determines that the load determination count value M reaches a predetermined value (that is, the pattern (1, 0, 1) is continuously maintained a predetermined number of times) in processing step S809, the load detection circuit 112 sets the end position Tcomp of the section T2 to the second end position Tcomp2 (step S810). In this case, the control circuit 103 instructs the load determination completion (step S811), and then returns to processing step S503.

The control circuit 103 determines that the generation of the induced signal VRs is delayed due to the large load, based on the pattern (1, 0, 1) being continuously obtained a predetermined number of times. The load is determined to be large hands, and the end position Tcomp of the section T2 is set to the second end position Tcomp2.

When it is determined that the load determination count value M does not reach a predetermined value in processing step S809, the control circuit 103 returns to processing step S503 immediately.

In FIG. 6, in the state of large mounted hands and slightly low energy 2, since the end position Tcomp of the section T2 is set to the second end position Tcomp2, the pattern of the induced signal Vrs becomes (1, 1, 0), and the rank of the main drive pulse P1 is maintained.

Meanwhile, in the processes of processing steps S802, and S804 to S811, when the determination value of the section T1 is "1", the end position Tcomp of the section T2 is once returned to the first end position Tcomp1 (step S805). However, when the pattern (pattern (1, 0, 1) in the present embodiment) indicating that the main drive pulse P1 is required to be ranked up is continuously obtained a predetermined number of times, the main drive pulse P1 is maintained without being ranked up until the pattern is obtained the predetermined number of times, and when the pattern is obtained the predetermined number of times, the end position Tcomp of the section T2 returned to an original state is shifted by a predetermined amount from the first end position Tcomp1 to the second end position Tcomp2 located at the rear side and then a detection is performed. As seen from the above, even when the pattern indicating rank-up is generated at the time of changing the end position Tcomp, the rank is maintained until the load is determined, and thus it is possible to suppress the dissipation of energy without performing rank-up unnecessarily.

In processing step S811, when the load is determined and the setting of the end position Tcomp is terminated, setting to a state of load determination completion is performed.

In processing steps S803 and S804, it is determined whether the load determination is terminated in processing step S811. After the load determination is terminated on the basis of the pattern of the induced signal VRs, the load detection circuit 112 does not change the end position Tcomp of the section such as the section T2 other than the initial section T1 within the corresponding cycle. The load detection circuit 112 performs the load determination by performing the process of FIG. 7 at the time of battery exchange or at the time of system reset, and sets the end position Tcomp of the section T2 or the like.

As described above, according to the second embodiment of the invention, it is possible to exhibit the same effect as that of the first embodiment, and to suppress the dissipation of power consumption without performing rank-up unnecessarily. In addition, battery life is prevented from considerably fluctuating and deteriorating due to the moment of mounted hands, and thus it is possible to improve the limit value of the moment of mounted hands capable of satisfying target battery life, and to improve the additional value of products.

In addition, according to the movement 114 of the first and second embodiments of the invention, driving by a drive pulse having appropriate drive energy is performed by accurately detecting the degree of the margin of drive energy even when the load is large, and thus it is possible to establish an analog electronic timepiece capable of suppressing the dissipation of energy.

In addition, according to the analog electronic timepiece of the first and second embodiments of the invention, driving by a drive pulse having appropriate drive energy is performed by accurately detecting the degree of the margin of drive energy even when the load is large, and thus it is possible to suppress the dissipation of energy, and to allow the use of a battery for a long period of time when the battery is used as a power supply.

Next, a third embodiment of the invention will be described. In the present third embodiment, the block diagram and the configuration of the stepping motor 105 are also the same as those in FIGS. 1 and 2.

FIG. 8 is a timing diagram when the stepping motor 105 is driven by the main drive pulse P1 in the third embodiment of the invention, and shows states indicating the margin of energy of the main drive pulse P1 for a load, rotation behaviors of the rotor 202, timings of the generation of the induced signal VRs, and patterns of the induced signal VRs indicating a rotation state (determination values of the induced signal VRs in sections T1 to T3).

In FIG. 8, as is the case with FIG. 3, the detection section T is divided into a first section T1 after driving by the main drive pulse P1, a second section T2 coming after the first section T1, and a third section coming after the second section.

Tcomp1 is a boundary between the section T1 and the section T2, and Tcomp2 is a boundary between the section T2 and the section T3. As positions of the boundary Tcomp1, a plurality of (in the present embodiment, two types of first position (front side) K1 and second position (rear side) K2 located further rearward than the first position K1) positions are prepared, and the position thereof is set to either of the position K1 or K2 depending on a rotation state of the stepping motor 105 to perform the detection of the rotation state.

The width of the detection section T or the section T3 is not necessarily maintained constant, but the width of the detection section T or the width of the section T3 is not changed even when the position of the boundary Tcomp1 is changed. Therefore, when the boundary Tcomp1 is located at the second position K2, the width of the section T1 is made larger and the width of the section T2 is made smaller than in a case where the boundary is located at the first position K1.

It is possible to appropriately set which position the position K1 or K2 of the boundary Tcomp1 is set to, in accordance with the weight or the like of the time indicating hands to be used. For example, the width of the section T2 when the boundary is located at the first position K1 can be configured to be two times the width thereof when the boundary is located at the second position K2.

In addition, a plurality of positions are prepared as the positions K1 and K2, and an appropriate position is selected and used in accordance with the weight or the like of the time indicating hands to be used, thereby allowing good rotation detection to be realized.

When the induced signal VRs is detected in the detection section T, the rotation detection circuit 111 is configured to detect the induced signal VRs by sampling the induced signal VRs with a predetermined sampling period. The detection section T is constituted by a plurality of sampling periods, and the induced signal VRs is detected at a plurality of points in time by sampling the induced signal VRs in each of the sampling periods.

In this manner, the entire detection section T which starts after driving by the main drive pulse P1 is divided into three or more sections (three sections T1 to T3) in the present embodiment). Meanwhile, in the present third embodiment, a section (mask section) in which the induced signal VRs after the driving by the main drive pulse P1 is not used in the determination of the rotation state is also not provided.

When the XY coordinate space at which the magnetic pole axis A of the rotor 202 is located due to the rotation of the rotor 202 is divided into the first quadrant I to the fourth quadrant IV centering on the rotor 202, the section T1, the section T2, and the section T3 can be expressed as follows, in accordance with the magnitude (energy margin) of the margin of energy of the main drive pulse P1 at the time of driving a normal load. The term "normal load" as used herein means a load which is driven in a normal time. In the present embodiment, a load when time indicating hands (hour hand 107, minute hand 108, and second hand 109) which are light and have predetermined weights are driven is set to the normal load.

In the "state of slightly low energy" (state (rank maintenance state) where the stepping motor 105 can be rotated even when the main drive pulse P1 is not changed without performing the rank-up or the rank-down of the main drive pulse P1, and state where the pattern (1, 1, 0) of the induced signal VRs is obtained) to which the energy state of the main drive pulse P1 for a load corresponds, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III. In this state, the boundary Tcomp1 is set to the second position K2 to perform the detection of the rotation state.

In the "state of considerably low energy" (state where the stepping motor 105 can be rotated, but the rank-up of the main drive pulse P1 is required in order to stably rotate the stepping motor 105, and state where an induced signal pattern (1, 0, 1) is obtained) where the energy state is reduced by a predetermined amount to more than that in the "state of slightly low energy", the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial backward rotation of the rotor 202 in the third quadrant III. In this state, since the section T1 is set to "1", the boundary Tcomp1 is set to the second position K2 to perform the detection of the rotation state.

In the "state of a slight drive margin" (state where the stepping motor 105 can be rotated, but the rank-up of the main drive pulse P1 is required in order to stably rotate the stepping motor 105, and state where an induced signal pattern (1, 0, 1) is obtained) where the energy state is reduced by a predetermined amount to more than that in the "state of considerably low energy", the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial forward rotation state and an initial backward rotation of the rotor 202 in the third quadrant III.

In this state, the boundary Tcomp1 is also set to the second position K2 to perform the detection of the rotation state. When the boundary Tcomp1 is maintained at the position K1 without being changed, a pattern (1, 1, 1) is obtained due to slow rotation in spite of the state of a slight drive margin, and thus there is a concern that the rank may be maintained. However, by changing the boundary Tcomp1 to the position K2 when the section T1 is set to "1", the pattern (1, 0, 1) is obtained and rank-up is performed. Therefore, driving by the main drive pulse P1 having appropriate energy is performed.

In the "non-rotation state" (state where the stepping motor 105 cannot be rotated, and the induced signal pattern (1, 0, 0) is obtained) where the energy state is reduced by a predetermined amount to more than that in the "state of a slight drive margin", the section T1 is a section for determining an initial forward rotation state of the rotor 202 in the second quadrant II of a space centering on the rotor 202, the section T2 is a section for determining an initial backward rotation state of the rotor 202 in the second quadrant II and the first quadrant I, and the section T3 is a section for determining a rotation state after an initial backward rotation state and a second forward rotation of the rotor 202 in the first quadrant I. In this state, the boundary Tcomp1 is set to the second position K2 to perform the detection of the rotation state.

In the "state of a normal drive margin" (state where the main drive pulse P1 is ranked down when the stepping motor 105 can be rotated and continuous rotation a predetermined number of times (PCD count) is possible, and state where the induced signal pattern (0, 1, 0) is obtained) where the energy state is increased by a predetermined amount to more than that in the "state of slightly low energy", the section T1 is a section for determining an initial forward rotation state of the rotor 202 in the third quadrant III of a space centering on the rotor 202, the section T2 is a section for determining an initial forward rotation state and an initial backward rotation state of the rotor 202 in the third quadrant III, and the section T3 is a section for determining a rotation state after an initial backward rotation of the rotor 202 in the third quadrant III. In this state, since the section T1 is set to "0", the boundary Tcomp1 is set to the first position K1 to perform the detection of the rotation state.

In the "state of a large drive margin" (state where the main drive pulse P1 is ranked down when the stepping motor 105 can be rotated and continuous rotation a predetermined number of times (PCD count) is possible, and state where the induced signal pattern (0, 1, 0) is obtained) where the energy state is increased by a predetermined amount to more than that in the "state of a normal drive margin", the section T1 is a section for determining an initial forward rotation state of the rotor 202 in the third quadrant III of a space centering on the rotor 202, the section T2 is a section for determining a state after an initial backward rotation of the rotor 202 in the third quadrant III, and the section T3 is a section for determining a rotation state after an initial backward rotation of the rotor 202 in the third quadrant III. In this state, since the section T1 is also set to "0", the boundary Tcomp1 is set to the first position K1 to perform the detection of the rotation state.

FIG. 9 is a determination chart in which operations of the third embodiment of the invention are collected. In FIG. 9, as mentioned above, the case where the induced signal VRs exceeding the reference threshold voltage Vcomp is detected is expressed as a determination value "1", and the induced signal VRs exceeding the reference threshold voltage Vcomp cannot be detected is expressed as a determination value "0". In addition, "0/1" denotes that the determination value may be "1" or "0".

As shown in FIG. 9, referring to the determination chart of FIG. 9 which is stored in the control circuit 103 on the basis of the pattern in which the rotation detection circuit 111 detects the presence or absence of the induced signal VRs exceeding the reference threshold voltage Vcomp, and the load detection circuit 112 determines the detection time of the induced signal VRs, the control circuit 103 and the drive pulse selection circuit 104 control the rotation of the stepping motor 105 by performing pulse control such as the rank-up and the rank-down of the main drive pulse P1 or driving by the correction drive pulse P2.

For example, in a case of a pattern (0/1, 0, 0), the control circuit 103 determines that the stepping motor 105 is not rotated (non-rotated), and controls the drive pulse selection circuit 104 so as to drive the stepping motor 105 by the correction drive pulse P2, and then controls the drive pulse selection circuit 104 so as to drive the stepping motor by performing rank-up to the main drive pulse P1 one rank above at the time of next-time driving.

In a case of a pattern (0, 1, 0/1), the control circuit 103 determines a rotation in the state of normal hands and sufficient energy, and performs pulse control so as to rank down the drive energy of the main drive pulse P1 when this state is continuously performed a predetermined number of times.

When the boundary Tcomp1 is maintained at the position K1 without being changed even in a case where the section T1 is set to "1", the pattern (1, 1, 1) is obtained in the state of a slight drive margin and thus the rank may be maintained. For this reason, there is the possibility of driving by the correction drive pulse P2 due to non-rotation. However, by changing the boundary Tcomp1 to the position K2 when the section T1 is set to "1", the pattern (1, 0, 1) is obtained and thus rank-up is performed. The driving by the main drive pulse P1 having appropriate energy is performed due to rank-up, and the driving by the correction drive pulse P2 is avoided.

Figure 10:
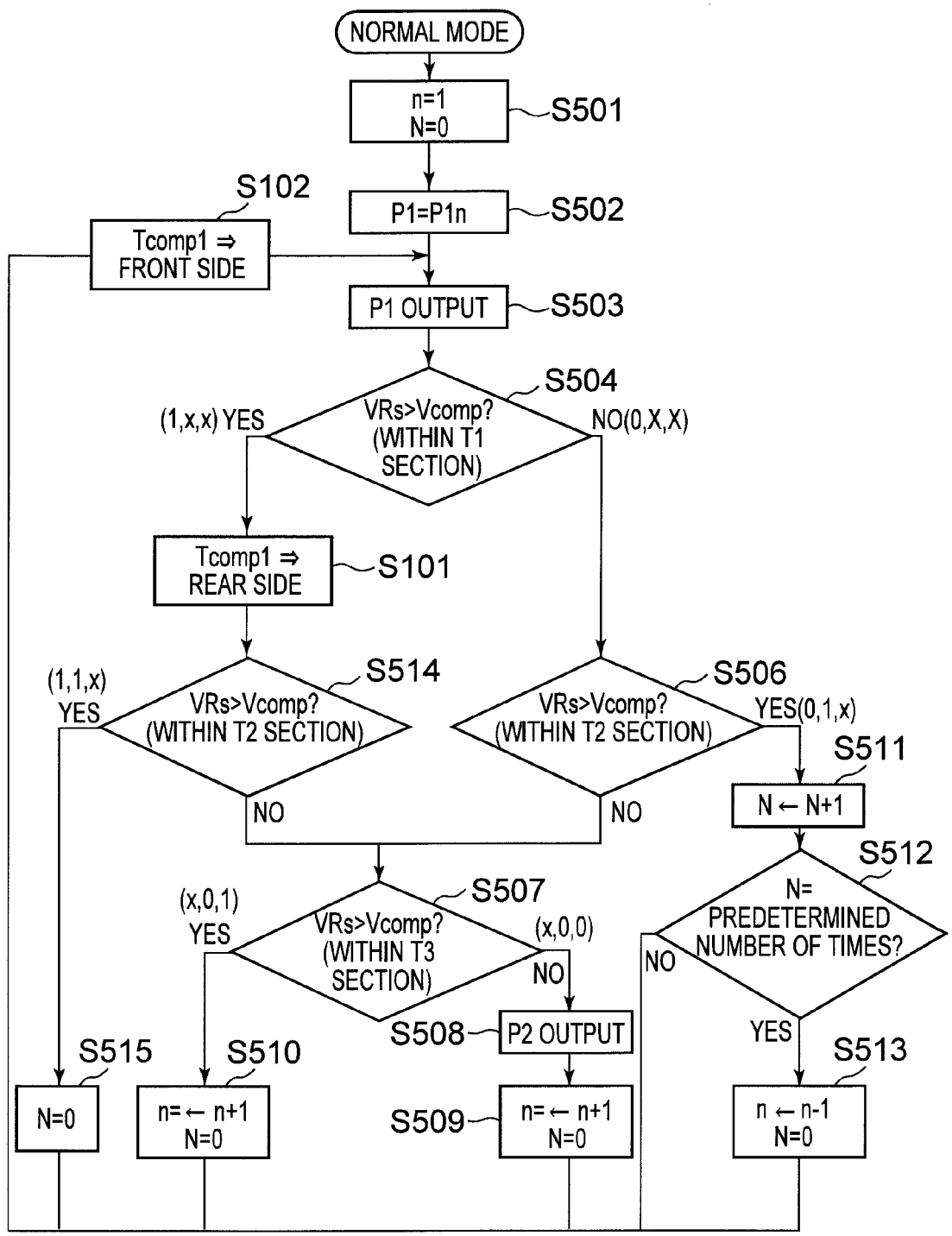
FIG. 10 is a flow chart illustrating the operations of the third embodiment of the invention.

FIG. 10 is a flow chart illustrating operations of the third embodiment of the invention, and is a flow chart mainly illustrating processes of the control circuit 103. Portions in which the same processes as those in FIG. 5 are performed are denoted by the same reference numerals and signs.

Hereinafter, operations of the third embodiment of the invention with respect to portions which are different from those of the first embodiment will be described in detail with reference to FIGS. 1, 2, and 8 to 10.

The control circuit 103 outputs a control signal so as to rotationally drive the stepping motor 105 by the main drive pulse P11 having a minimum pulse width (steps S502 and S503), by counting a timepiece signal from the frequency dividing circuit 102 to perform a clocking operation, first setting the energy rank n of the main drive pulse P1n to 1 and setting the number of times N to 0 (step S501 of FIG. 10).

The control circuit 103 determines whether the induced signal VRs exceeding the reference threshold voltage Vcomp is detected within the section T1 (step S504). When it is determined that the induced signal VRs exceeding the reference threshold voltage Vcomp is not detected within the section T1 (when the pattern corresponds to (0, x, x)), processes of processing step S506 to S513 are performed as is the case with the first embodiment.

After processing steps S509, S510, and S513, the boundary Tcomp1 between the section T1 and the section T2 which is an end position of the section T1 is set to the first position K1 (front side) by the load detection circuit 112 (step S102), and then the process returns to processing step S503. Thereby, each of the sections T1 to T3 of the detection section T returns to an initialized position and width. The rotation detection in next processing step S504 is performed in a state where the boundary Tcomp1 is set to the first position K1. When the determination value of the section T1 is "0" in processing step S504, the rotation detection in the subsequent sections (sections T2 and T3) is performed in a state where the boundary Tcomp1 is set to the first position K1.

On the other hand, when it is determined that the induced signal VRs exceeding the reference threshold voltage Vcomp is detected within the section T1 in processing step S504 (when the pattern corresponds to (1, x, x)), the load detection circuit 112 sets the boundary Tcomp1 to the second position K2 (rear side) (step S101).

The control circuit 103 determines whether the induced signal VRs exceeding the reference threshold voltage Vcomp is detected within the section T2 in a state where the boundary Tcomp1 is set to the second position K2 (step S514). That is, since the determination value in the section T1 is "1", the boundary Tcomp1 is set to the second position K2 in processing step S101, and the subsequent rotation detection (rotation detection in the sections T2 and T3) is performed (steps S514 and S515).

After processing step S515, the boundary Tcomp1 is set to the first position K1 by the load detection circuit 112 (step S102), and the process returns to processing step S503. Thereby, each of the sections T1 to T3 of the detection section T returns to an initialized position and width. The rotation detection in next processing step S504 is performed in a state where the boundary Tcomp1 is set to the first position K1.

As described above, the stepping motor control circuit according to the third embodiment of the invention includes a rotation detection unit that detects the induced signal VRs exceeding the predetermined reference threshold value Vcomp generated by the stepping motor 105 in the detection section T divided into a plurality of sections T1 to T3, and detects a rotation state on the basis of a pattern indicating whether the induced signal VRs exceeding the reference threshold value is detected in each of the sections T1 to T3, and a control unit that selects the main drive pulse P1 depending on the rotation state detected by the rotation detection unit from a plurality of main drive pulses P1 which are different from each other in energy, and drives the stepping motor 105. When the induced signal VRs exceeding the reference threshold value Vcomp is detected in the initial section T1 out of the plurality of sections T1 to T3, the rotation detection unit detects the induced signal by setting the boundary Tcomp1 between the initial section T1 and the second section T2 further to the rear side and reducing the width of the second section T2 further than in a case where the induced signal exceeding the reference threshold value Vcomp is not detected in the initial section T1.

Here, as positions of the boundary Tcomp1 between the initial section T1 and the second section T2, a first position K1 and a second position K2 located further rearward than the first position K1 are prepared. When the induced signal VRs exceeding the reference threshold value Vcomp is detected in the initial section T1, the rotation detection unit can be configured to set the boundary Tcomp1 to the second position K2 and detect the induced signal VRs in the section subsequent to the second T2 to detect the rotation state.

In addition, as the positions of the boundary Tcomp1 between the initial section T1 and the second section T2, the first position K1 and the second position K2 located further rearward than the first position K1 are prepared. When the induced signal VRs exceeding the reference threshold value Vcomp is not detected in the initial section T1, the rotation detection unit can be configured to detect the induced signal VRs in the section subsequent to the second T2 to detect the rotation state by setting the boundary Tcomp1 to the first position K1.

In addition, the detection section T is divided into the first section T1 after driving by the main drive pulse P1, the second section T2 coming after the first section T1, and the third section T3 coming after the second section T2. In a state (rank maintenance state) where the rank of the main drive pulse P1 is not changed, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III.

The load detection circuit 112 can be configured to perform detection subsequent to the section T2 by setting the boundary Tcomp1 to the second position K2 when the induced signal VRs exceeding the reference threshold value Vcomp is detected in the section T1, and to perform detection subsequent to the section T2 by setting the boundary Tcomp1 to the first position K1 when the induced signal VRs exceeding the reference threshold value Vcomp has not been detected in the section T1.

Therefore, it is possible to perform driving by a drive pulse having appropriate drive energy and suppress the dissipation of energy, by accurately detecting the degree of the margin of drive energy even when a load is large and the rotational speed slows down.

In addition, it is possible to perform rank-up only when the drive margin deteriorates, and to suppress the dissipation of power due to unnecessary rank-up.

In addition, even when a battery is used as a power supply, battery life is prevented from considerably fluctuating and deteriorating due to the moment of mounted hands, and thus it is possible to improve the limit value of the moment of mounted hands capable of satisfying target battery life, and to improve the additional value of products.

In addition, a defect of rotation detection that rank-down cannot be performed in spite of an excessive drive margin, or rank-up cannot be performed in spite of no drive margin is eliminated, and thus it is possible to realize stable driving.

In addition, according to the movement 114 of the third embodiment of the invention, driving by a drive pulse having appropriate drive energy is performed by accurately detecting the degree of the margin of drive energy even when the load is large, and thus it is possible to establish an analog electronic timepiece capable of suppressing the dissipation of energy.

In addition, according to the analog electronic timepiece of the third embodiment of the invention, driving by a drive pulse having appropriate drive energy is performed by accurately detecting the degree of the margin of drive energy even when the load is large, and thus it is possible to suppress the dissipation of energy, and to allow the use of a battery for a long period of time when the battery is used as a power supply.

Figure 11:
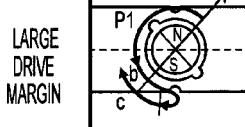
FIG. 11 is a timing diagram illustrating operations of a fourth embodiment of the invention.

FIG. 11 is a timing diagram when the stepping motor 105 is driven by the main drive pulse P1 in a fourth embodiment of the invention, and shows states indicating the margin of energy of the main drive pulse P1 for a load, rotation behaviors of the rotor 202, timings of the generation of the induced signal VRs, and patterns of the induced signal VRs indicating a rotation state (determination values of the induced signal VRs in sections T1 to T3).

In FIG. 11, as is the case with FIG. 3, in the "state of slightly low energy" (state (rank maintenance) where the stepping motor 105 can be rotated even when the main drive pulse P1 is not changed without performing the rank-up or the rank-down of the main drive pulse P1, and state where the pattern (1, 1, 0/1) of the induced signal VRs is obtained) to which the energy state of the main drive pulse P1 for a load corresponds, the section T1 is a section for determining an initial forward rotation state of the rotor 202 in the second quadrant II of a space centering on the rotor 202, the section T2 is a section for determining an initial forward rotation state of the rotor 202 in the second quadrant II and the third quadrant III, and the section T3 is a section for determining a rotation state after an initial backward rotation of the rotor 202 in the third quadrant III.

In addition, in another energy state, the relationship between the sections T1 to T3 and the rotation position of the rotor 202 is also the same as that in FIG. 3.

Meanwhile, in the present fourth embodiment, the block diagram and the configuration of the stepping motor are also the same as those in FIGS. 1 and 2.

As mentioned above, in the first embodiment, as shown in FIG. 3, the load detection circuit 112 is configured to set the boundary (that is, end position of the section T2) between the section T2 and the section T3 to the first end position Tcomp1 located at the front side when the section T1 is set to "1", and to set the boundary (that is, end position of the section T2) between the section T2 and the section T3 to the second end position Tcomp2 located to the rear side when the section T1 is set to "0".

In addition, in the third embodiment, as shown in FIG. 8, the load detection circuit 112 is configured to set the boundary (that is, end position of the section T1) Tcomp1 between the section T1 and the section T2 to the first position K1 located at the front side when the section T1 is set to "0", and to set the boundary (that is, end position of the section T1) Tcomp1 between the section T1 and the section T2 to the second position K2 located at the rear side when the section T1 is set to "1".

On the other hand, in the fourth embodiment of the invention, the load detection circuit 112 is configured to perform the processes of both the first embodiment and the third embodiment.

That is, in the present fourth embodiment, as shown in FIG. 11, when the section T1 is set to "0", the load detection circuit 112 sets the boundary (that is, end position of the section T1) Tcomp1 between the section T1 and the section T2 to the first position K1 located at the front side, and sets the boundary (that is, end position of the section T2) Tcomp2 between the section T2 and section T3 to the second end position located at the rear side.

In addition, when the section T1 is set to "1", the load detection circuit 112 is configured to set the boundary (that is, end position of the section T1) Tcomp1 between the section T1 and the section T2 to the second position K2 located at the rear side, and to set the boundary (that is, end position of the section T2) Tcomp2 between the section T2 and the section T3 to the first end position located further frontward than the second end position.

Thereby, when the section T1 is set to "1", the load detection circuit 112 is configured to perform detection by reducing the width of the section T2 further than in a case where the section T1 is set to "0".

In addition, the section T1 is configured to necessarily include a leading detection region in the entire detection section T. That is, in the section T1, detection by detection pulse (sampling pulse for detecting the induced signal VRs) which necessarily initially appears is performed.

Hereinafter, operations of featuring portions according to the fourth embodiment of the invention will be described with reference to FIGS. 1, 2, and 11. Configurations and operations other than the featuring portions are the same as those of the third embodiment.

As is the case with the first to third embodiments, when the control circuit 103 counts a timepiece signal to perform a clocking operation, and the drive pulse selection circuit 104 rotationally drives the stepping motor 105 by the main drive pulse P1, the rotation detection circuit 111 detects the induced signal VRs exceeding the reference threshold voltage Vcomp generated by the stepping motor 105 in the detection section T after driving, and the load detection circuit 112 outputs a detection signal, indicating a determination result of whether the induced signal VRs exceeding the reference threshold voltage Vcomp is detected in the section T1, to the control circuit 103.

When it is determined that the rotation detection circuit 111 does not detect the induced signal exceeding the reference threshold voltage Vcomp in the section T1 (when the determination value of the section T1 is "0"), the load detection circuit 112 sets the boundary (that is, end position of the section T2) Tcomp2 between the section T2 and the section T3 to the second end position located at the rear side.

Meanwhile, as initial setting, the boundary Tcomp1 (that is, end position of the section T1) between the section T1 and the section T2 is set to the first position K1 located further frontward than the second position K2. Therefore, every time the rotation detection operation in each drive cycle is terminated, the load detection circuit 112 performs rotation detection by setting the boundary Tcomp1 between the section T1 and the section T2 to the first position K1 located at the front side.

In this manner, when the section T1 is set to "0", the load detection circuit 112 determines that the drive margin of the stepping motor 105 is sufficiently taken, and that the main drive pulse P1 is not required to be ranked up. In consideration of the output of the induced signal VRs being delayed by the influence of the mounted hands or the like, the load detection circuit determines the sections T2 and T3 after the boundary Tcomp2 between the section T2 and the section T3 is shifted to the second end position located at the rear side.

On the other hand, when it is determined that the rotation detection circuit 111 detects the induced signal exceeding the reference threshold voltage Vcomp in the section T1 (when the determination value of the section T1 is "1"), the load detection circuit 112 sets the boundary Tcomp2 (that is, end position of the section T2) between the section T2 and the section T3 to the first end position located further frontward than the second end position, and sets the boundary Tcomp1 between the section T1 and the section T2 to the second position K2 located further rearward than the first position K1. Thereby, detection is performed by reducing the width of the section T2.

In this manner, when the determination value of the section T1 is "1", the main drive pulse P1 has no drive margin, rank-up comes close to being required, and thus rotation becomes further slower due to no drive margin, which leads to a concern that the induced signal VRs to be generated in the section T1 may be generated in the section T2 due to its delay. Therefore, detection is performed by shifting the boundary Tcomp1 between the section T1 and the section T2 to the rear side, and shifting the boundary Tcomp2 between the section T2 and the section T3 to the front side, thereby allowing accurate rotation detection to be performed.

Meanwhile, the section T1 is configured to necessarily include a leading detection region in the entire detection section T. Thereby, in the section T1, detection by detection pulse (sampling pulse) which necessarily initially appears is performed.

As described above, according to the fourth embodiment of the invention, the same effect as that of the embodiment mentioned above is exhibited. Further, it is possible to suppress excess rank-up due to the mounting of large hands or the generation of rank-down due to sudden rotation misdetection, and to prevent current consumption from being increased.

In addition, when the drive margin increases excessively, it is possible to simultaneously eliminate the generation of the induced signal VRs being erroneously determined to be the pattern (1, 1, 0) or the induced signal VRs being erroneously determined to be the pattern (1, 1, 0) in a state of a maximum drive margin, because the section T1 is set to "1" in spite of the determination value being set to "0".

Therefore, appropriate pulse control is realized, and thus it is possible to achieve long lifetime and to perform a stable operation, through a reduction in current consumption and appropriate pulse setting in a case of no drive margin.

Next, a fifth embodiment of the invention will be described. In the present fifth embodiment, the block diagram and the configuration of the stepping motor 105 are also the same as those in FIGS. 1 and 2.

FIG. 12 is a timing diagram when the stepping motor 105 is driven by the main drive pulse P1 in the fifth embodiment of the invention, and shows states indicating the margin of energy of the main drive pulse P1 for a load, rotation behaviors of the rotor 202, timings of the generation of the induced signal VRs, patterns of the induced signal VRs indicating a rotation state (determination values of the induced signal VRs in sections T1 to T3), and motor behaviors. The same portions as those of the first to fourth embodiments are denoted by the same reference numerals and signs.

In the present fifth embodiment, when the determination value "1" in the section T1 is obtained through accumulation by a predetermined number of times, a change is made so that the width of the section T1 is made larger than in a case where the determination value "0" in the section T1 is obtained.

When the induced signal VRs exceeding the reference threshold voltage Vcomp is detected a predetermined number of times in the section T1 ("state of slightly low energy", "state of considerably low energy", "state of very low energy", and "non-rotation state" in FIG. 12), the load detection circuit 112 is configured to perform detection subsequent to the section T2 in a state where the end position (that is, boundary between the section T1 and the section T2) Tcomp of the section T1 is shifted further to the rear side by a predetermined amount (state where the end position is shifted from the first end position Tcomp1 to the second end position Tcomp2) than in a case where the induced signal VRs exceeding the reference threshold value Vcomp is not detected in the section T1 ("sufficient energy state" in FIG. 12).

In FIG. 12, as is the case with FIG. 3, in the "state of slightly low energy" (state where rank-up and rank-down of the main drive pulse P1 are not performed, but the main drive pulse P1 is maintained without being changed and the stepping motor 105 can be rotated (rank maintenance state), and state where the pattern (1, 1, 0) of the induced signal VRs is obtained) to which the energy state of the main drive pulse P1 for a load corresponds, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III.

A case where the pattern (1, 0, 0) of the induced signal VRs is obtained corresponds to a case where the stepping motor 105 is non-rotated. The case of non-rotation includes a state (midway stop state) where the rotor 202 is stopped in the middle of rotation, and a state (non-rotation state) where the rotor 202 returns to an initial position.

In other energy states, the relationship between the sections T1 to T3 and the rotation position of the rotor 202 is the same as that in FIG. 3.

FIG. 15 is a determination chart illustrating all the patterns and a pulse control operation corresponding to each of the patterns in the fifth embodiment of the invention.

Referring to the determination chart of FIG. 15 which is stored in the control circuit 103 on the basis of the pattern in which the rotation detection circuit 111 detects the presence or absence of the induced signal VRs exceeding the reference threshold voltage Vcomp, and the load detection circuit 112 determines a section to which the induced signal VRs belongs, the control circuit 103 controls the rotation of the stepping motor 105 by performing pulse control such as the rank-up and the rank-down of the main drive pulse P1 or driving by the correction drive pulse P2.

For example, in a case of the pattern (0/1, 0, 0), the control circuit 103 determines that the stepping motor 105 is not rotated (midway stop state or non-rotation state), and controls the drive pulse selection circuit 104 so as to drive the stepping motor 105 by the correction drive pulse P2 in a corresponding drive cycle, and then controls the drive pulse selection circuit 104 so as to drive the stepping motor by performing rank-up by the main drive pulse P1 one rank above in the next drive cycle.

In a case of a pattern (0/1, 0, 1), the control circuit 103 determines that the stepping motor is rotated in the state of considerably low energy or the state of very low energy and rank-up is required, and controls the drive pulse selection circuit 104 so as to drive stepping motor using the main drive pulse P1 one rank above in the next drive cycle.

In a case of the pattern (1, 1, 0/1), the control circuit 103 determines that the stepping motor is rotated in the state of slightly low energy, maintains the rank of the current main drive pulse P1 with no change (rank down prohibition), and controls the drive pulse selection circuit 104 so as to drive the stepping motor using the same main drive pulse P1 as the previous drive cycle in the next drive cycle. Simultaneously, the control circuit 103 resets the number of times (rank change count value N) that driving in the sufficient energy state is continuously performed to 0.

In a case of the pattern (0, 1, 0/1), the control circuit 103 determines that the stepping motor is rotated in the sufficient energy state, counts the number of times that driving in the sufficient energy state is continuously performed, and controls the drive pulse selection circuit 104 so as to drive the stepping motor using the same main drive pulse P1 in the next drive cycle without changing the rank of the current main drive pulse P1 until the rank change count value N reaches a predetermined value. In addition, when the rank change count value N reaches the predetermined value, the control circuit 103 controls the drive pulse selection circuit 104 so as to drive the stepping motor by performing rank-down by main drive pulse P1 below one rank in the next drive cycle, and resets the rank change count value N to 0. The driving state when any of the patterns (1, 1, 0/1) and (0, 1, 0/1) mentioned above appear is a driving state (normal driving) which is normally performed.

In this manner, when there is the possibility of a state where the energy of the main drive pulse P1 for a load is sufficient, in other words, when the section T1 is set to "0", the end position Tcomp of the section T1 is not shifted to the end position Tcomp2 located at the rear side (section T2 side). Therefore, the section T1 in this case is terminated earlier by a predetermined time than in the section T1 used when the section T1 is set to "1", so that the rotation state subsequent to the section T2 is detected.

On the other hand, when the state where "1" is obtained in the section T1 as in the "state of slightly low energy", the "state of considerably low energy", and the "state of very low energy" is obtained through accumulation by a predetermined number of times, the end position Tcomp of the section T1 is shifted to the end position Tcomp2 located at the rear side. In the present embodiment, since the width of the detection section T is set to a constant value, and the sum of the widths of the section T1 and the section T2 is set to a constant value, the width of the section T2 is set so as to be reduced by a predetermined amount with an increase in the width of the section T1, and thus the subsequent rotation state is detected.

In this manner, when the determination value "1" in the section T1 is generated a predetermined number of times, the end position Tcomp of the section T1 is shifted to the rear side by a predetermined amount, and thus it is possible to suppress the detection of the induced signal VRs being delayed from the section T1 into the section T2 due to the slow rotation of the rotor 202.

FIG. 13 is a timing diagram more specifically illustrating the operations of the present fifth embodiment, and the same portions as those in FIG. 12 are denoted by the same reference numerals and signs. FIG. 13 shows an example in which the end position of the section T1 is not changed even when the determination value "1" is detected a predetermined number of times in section T1.

As shown in FIG. 13, when the width of the section T1 is not changed even in a case where the determination value "1" in the section T1 is obtained a predetermined multiple number of times, in the "state of very low energy", the original pattern (1, 0, 1) is not obtained, but the pattern (1, 1, 1) is obtained, and thus, the main drive pulse P1 is maintained without being ranked-up. Therefore, when driving by the main drive pulse P1 is performed in the next drive cycle, further, no drive margin leads to non-rotation, and thus driving by the correction drive pulse P2 is performed, resulting in a problem of an increase in power consumption. However, according to the embodiment of the invention, it is possible to suppress the generation of such a situation.

In addition, as shown in FIG. 13, in the "midway stop state", the original pattern (1, 0, 0) is not obtained, but the same pattern (0, 1, 0) as that of the "sufficient energy state" is obtained, which leads to the midway stop state. In the embodiment of the invention, it is possible to suppress the generation of such a situation.

Meanwhile, the width of the detection section T is not necessarily maintained constant, but it is possible to perform various modifications such as changes of the width of the detection section T when the end position Tcomp of the section T1 is shifted, and the width of the detection section T when the end position is not shifted.

FIG. 14 is a timing diagram more specifically illustrating the operations of the present fifth embodiment, and the same portions as those in FIGS. 12 and 13 are denoted by the same reference numerals and signs.

In the present fifth embodiment, when the end position Tcomp of the section T1 is returned from the end position Tcomp2 to the end position Tcomp1, the above end position is not returned to the end position Tcomp1 immediately when the determination value "0" is obtained in the section T1, but the end position is returned to the end position Tcomp1 when the determination value "0" is obtained a predetermined multiple number of times in the section T1.

That is, as shown in FIG. 14, in the "state of very low energy" where the energy state is reduced by a predetermined amount to more than that in the "state of very low energy", the rotation of the rotor 202 becomes slow, and thus the determination value "0" may be obtained in the section T1 in a state where the section T1 is set to the end position Tcomp2. When the end position is returned to the end position Tcomp1 immediately in a case where the determination value "0" of the section T1 is obtained, the pattern (0, 1, 0/1) is also obtained after the next drive cycle, and rank-up is required but rank-up is not performed. Further, no drive margin leads to non-rotation, and thus there is the possibility of driving by the correction drive pulse P2 being generated.

However, as in the present fifth embodiment, when the determination value "0" is obtained a predetermined multiple number of times in the section T1, the end position is returned to the end position Tcomp1, and thus it is possible to accurately determine the energy state, to perform pulse control using the appropriate main drive pulse P1, and to reduce driving by the correction drive pulse P2.

In addition, in the midway stop state, when the end position is returned to the end position Tcomp1 immediately in a case where the determination value "0" of the section T1 is obtained, the pattern (0, 1, 0/1) is obtained and thus the determination of rotation is made. Therefore, driving by the correction drive pulse P2 is not performed, and as a result, there is the possibility of the rotor 202 being stopped at an intermediate position.

As in the present fifth embodiment, when the determination value "0" is obtained a predetermined multiple number of times in the section T1, the end position is returned to the end position Tcomp1, thereby allowing the energy state to be accurately determined. Therefore, it is possible to perform pulse control using the appropriate main drive pulse P1, to suppress the generation of the situation in which the rotor 202 is stopped at an intermediate position, to reduce driving by the correction drive pulse P2, and to reduce power consumption.

Figure 16:
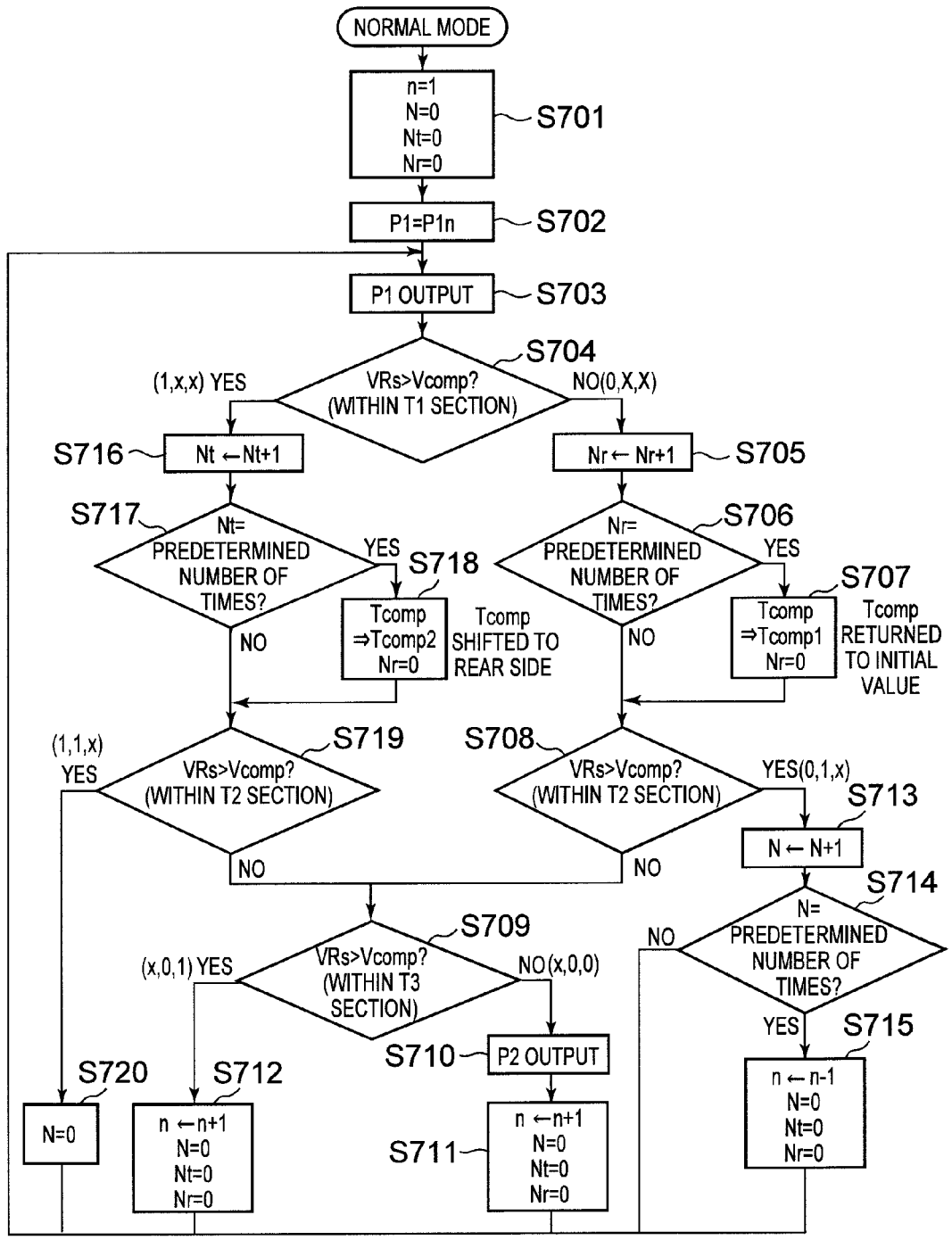
FIG. 16 is a flow chart illustrating the operations of the fifth embodiment of the invention.

FIG. 16 is a flow chart illustrating the operations of the embodiment of the invention, and is a flow chart mainly illustrating processes of the control circuit 103.

Hereinafter, the operations of the fifth embodiment of the invention will be described in detail with reference to FIGS. 1, 2, and 12 to 16.

The control circuit 103 counts a timepiece signal from the frequency dividing circuit 102 to perform a clocking operation, first resets the rank n of the main drive pulse P1n to 1, resets the rank change count value (first count value) N, used for changing the rank n, to 0, resets an end position change count value (second count value) Nt, used for changing the end position Tcomp of the section T1 to the end position Tcomp2, to 0, and resets an end position reset count value (third count value) Nr, used for returning the end position Tcomp of the section T1 to the end position Tcomp1, to 0 (step S701 in FIG. 16). Counters for counting the rank change count value N, the end position change count value Nt and the end position reset count value Nr are provided as a function of the control circuit 103.

Next, the control circuit 103 outputs a control signal so as to rotationally drive the stepping motor 105 by the main drive pulse P11 having a minimum pulse width which is set in processing step S701 (steps S702 and S703).

The drive pulse selection circuit 104 selects the main drive pulse P1n (here, main drive pulse P11) corresponding to the control signal from the control circuit 103, and rotationally drives the stepping motor 105. The stepping motor 105 is rotationally driven by the main drive pulse P11, and rotationally drives the time indicating hands 107 to 109 (calendar display unit 110 when the date is changed). Thereby, when the stepping motor 105 is normally rotated, the current time of day is displayed on the display unit 106 by the time indicating hands 107 to 109. In addition, today's date is displayed by the calendar display unit 110.

The control circuit 103 determines whether the rotation detection circuit 111 detects the induced signal VRs of the stepping motor 105 exceeding the predetermined reference threshold voltage Vcomp, and determines whether the load detection circuit 112 determines that the detection time t of the induced signal VRs is within the section T1 (that is, determines whether the rotation detection circuit 111 and the load detection circuit 112 detect the induced signal VRs exceeding the reference threshold voltage Vcomp within the section T1) (step S704).

When it is determined that the induced signal VRs exceeding the reference threshold voltage Vcomp is not detected within the section T1 (when the pattern corresponds to (0, x, x); however, the determination value "x" means that it does not matter whether the determination value is "1" or "0"), the control circuit 103 adds 1 to the end position reset count value Nr (step S705).

When it is determined that the end position reset count value Nr is accumulated and is set to a predetermined value (step S706), the load detection circuit 112 sets the end position Tcomp of the section T1 to the predetermined first end position Tcomp1 in which the section width of the section T1 is reduced, and the control circuit 103 resets the end position reset count value Nr to 0 (step S707). In the present fifth embodiment, the first end position Tcomp1 is an initial value.

The width of the detection section T is not necessarily required to be set to a constant value. However, in the present fifth embodiment, since the width of the detection section T is set to a constant value and the width of the section T3 is also set to a constant value, the width of the section T2 increases when the end position Tcomp of the section T1 is set to the first end position Tcomp1. In addition, the section width of the section T1 increases when the end position Tcomp of the section T1 is set to a predetermined position (second end position Tcomp2) terminated at the side located further rearward than the first end position Tcomp1, the width of the section T2 becomes smaller than in a case of the first end position Tcomp1.

The first end position Tcomp1 of the section T1 and the position of the second end position Tcomp2 can be appropriately set in accordance with the weight or the like of the time indicating hands to be used. In addition, a plurality of end positions different from each other are prepared as the second end position Tcomp2, and the appropriate end position Tcomp2 can be selected and used in accordance with the weight or the like of the time indicating hands to be used.

The control circuit 103 determines whether the load detection circuit 112 detects the induced signal VRs exceeding the reference threshold voltage Vcomp in the section T2, in a state where the end position Tcomp is set to the first end position Tcomp1 which is an initial value as mentioned above (step S708).

On the other hand, when it is determined that the end position reset count value Nr is not set to a predetermined value in processing step S706, the load detection circuit 112 performs processing step S708 without changing the end position Tcomp, and determines whether the induced signal VRs exceeding the reference threshold voltage Vcomp is detected in the section T2.

In this manner, when the end position reset count value Nr is accumulated and is set to a predetermined value, the load detection circuit 112 is configured to set the end position Tcomp of the section T1 to the first end position Tcomp1. Therefore, as described above with respect to FIGS. 12 to 14, it is possible to accurately determine the energy state of the main drive pulse P1 for a load, and to perform pulse control using the appropriate main drive pulse P1.

That is, the end position Tcomp of the section T1 is returned to the first end position Tcomp1, thereby allowing the detection of the "sufficient energy state" to be accurately performed as shown in FIG. 13. In addition, when the determination value "0" of the section T1 is accumulated before reset and is counted a predetermined number of times, a change to the end position Tcomp1 is performed, and thus it is possible to accurately perform pulse control in accordance with the energy state.

Next, when it is determined that the induced signal VRs exceeding the reference threshold voltage Vcomp is not detected within the section T2 in processing step S708 (when the pattern corresponds to (0, 0, x)), the control circuit 103 determines whether the induced signal VRs exceeding, the reference threshold voltage Vcomp is detected within the section T3 (step S709).

When it is determined that the induced signal VRs exceeding the reference threshold voltage Vcomp is not detected within the section T3 in processing step S709 (when the pattern corresponds to (x, 0, 0) and non-rotation), the control circuit 103 forces the stepping motor 105 to be rotated by the correction drive pulse P2 having the same polarity as that of the main drive pulse P1 in processing step S703 in the corresponding drive cycle (step S710), and then ranks up the rank n of the main drive pulse P1 by one to change the ranked-up pulse to a main drive pulse P1 (n+1), returns to processing step S702 after the rank change count value N, the end position change count value Nt and the end position reset count value Nr are reset to 0 (step S711), and drives the stepping motor by the main drive pulse P1 (n+1) in the next drive cycle.

When it is determined that the induced signal VRs exceeding the reference threshold voltage Vcomp is detected within the section T3 (when the pattern corresponds to (x, 0, 1)) in processing step S709, the control circuit 103 ranks up the main drive pulse P1 by one, without performing driving by the correction drive pulse P2, to change the ranked-up pulse to the main drive pulse P1 (n+1), returns to processing step S702 after the rank change count value N, the end position change count value Nt and the end position reset count value Nr are reset to 0 (step S712), and drives the stepping motor by the main drive pulse P1 (n+1) in the next drive cycle.

When it is determined that the induced signal VRs exceeding the reference threshold voltage Vcomp is detected within the section T2 in processing step S708 (when the pattern corresponds to (0, 1, x)), the control circuit 103 adds 1 to the rank change count value N (step S713), and then determines whether the rank change count value N is set to a predetermined value (step S714).

When it is determined that the rank change count value N is not set to a predetermined value in processing step S714, the control circuit 103 returns to processing step S702.

When it is determined that the rank change count value N is set to a predetermined value in processing step S714, the control circuit 103 ranks down the main drive pulse P1 by one to change the ranked-down pulse to the main drive pulse P1 (n−1), returns to processing step S702 after the rank change count value N, the end position change count value Nt and the end position reset count value Nr are reset to 0 (step S715), and drives the stepping motor by the main drive pulse P1 (n−1) in the next drive cycle.

On the other hand, when it is determined that the induced signal VRs exceeding the reference threshold voltage Vcomp is detected within the section T1 in processing step S704 (when the pattern corresponds to (1, x, x)), the control circuit 103 adds 1 to the end position change count value Nt (step S716).

The load detection circuit 112 determines that the end position change count value Nt is accumulated before reset and is set to a predetermined value (step S717), the load detection circuit 112 sets the end position of the section T1 to the second end position Tcomp2, and the control circuit 103 resets the end position change count value Nt to 0 (step S718).

The load detection circuit 112 determines the induced signal VRs in the section T2 in this state, and the control circuit 103 obtains a determination value in the section T2 on the basis of the determination result of the load detection circuit 112 (step S719).

When it is determined that the end position change count value Nt does not reach a predetermined value in processing step S717, the load detection circuit 112 performs step S719 without setting the end position Tcomp of the section T1 to the second end position Tcomp2, and determines the induced signal VRs in the section T2 in this state, and the control circuit 103 obtains a determination value in the section T2 on the basis of the determination result of the load detection circuit 112 (step S719).

In this manner, when the accumulative number is set to a predetermined value before the end position change count value Nt is reset, the load detection circuit 112 is configured to set the end position Tcomp of the section T1 to the second end position Tcomp2. Therefore, as described above with respect to FIGS. 12 to 14, even when the load suddenly increases, it is possible to perform accurate rotation detection and pulse control.

That is, when the width of the section T1 is not changed even in a case where the determination value "1" is obtained in the section T1, as shown in FIG. 13, in the "state of very low energy", the original pattern (1, 0, 1) is not obtained but the pattern (1, 1, 1) is obtained, and the rank of the main drive pulse P1 is maintained.

Therefore, there is the possibility of driving by the correction drive pulse P2 being performed due to non-rotation in the next drive cycle, but it is possible to suppress the generation of such a situation in the present fifth embodiment. Further, as shown in FIG. 13, in the "midway stop state", the original pattern (1, 0, 0) is not obtained, but the same pattern (0, 1, 0) as that of the "sufficient energy state" is obtained, which leads to the midway stop state. It is possible to suppress the generation of such a situation in the embodiment of the invention. In addition, when the determination value "1" of the section T1 is accumulated and is obtained a predetermined number of times, a change to the end position Tcomp1 is performed, and thus it is possible to more accurately perform pulse control in accordance with the energy state.

When it is determined that the induced signal VRs exceeding the reference threshold voltage Vcomp is detected within the section T2 in processing step S719 (when the pattern corresponds to (1, 1, x)), the control circuit 103 returns to processing step S702 after the rank change count value N is reset to 0 (step S720).

When it is determined that the induced signal VRs exceeding the reference threshold voltage Vcomp is not detected within the section T2 in processing step S719 (when the pattern corresponds to (1, 0, x)), the control circuit 103 performs processing step S709.

Hereinafter, the rotation control operation of the stepping motor 105 is performed by repeating the above-mentioned processes.

As described above, the stepping motor control circuit according to the fifth embodiment of the invention includes a rotation detection unit that detects the induced signal VRs exceeding the predetermined reference threshold which is voltage Vcomp generated by the stepping motor 105 in the detection section T divided into at least three sections T1 to T3, and detects a rotation state on the basis of a pattern indicating whether the induced signal VRs exceeding the reference threshold voltage Vcomp is detected in each of the sections T1 to T3, and a control unit that selects the main drive pulse P1 depending on the rotation state detected by the rotation detection unit from a plurality of main drive pulses P1 which are different from each other in energy, and drives the stepping motor 105. When the induced signal VRs exceeding the reference threshold voltage Vcomp is detected a predetermined multiple number of times in the initial section T1 out of a plurality of sections T1 to T3, the rotation detection unit performs the detection thereof after the section T2 by shifting the end position Tcomp of the initial section T1 to the rear side by a predetermined amount.

In addition, the stepping motor control circuit according to the fifth embodiment of the invention selects the main drive pulse P1 on the basis of the magnitude relation between a detection point in time of the induced signal VRs indicating the rotation of the stepping motor 105 and a predetermined reference time, divides the detection section T of the induced signal VRs into at least three (sections T1, T2, and T3), prohibits ranking down the main drive pulse P1 by considering a drive margin to have deteriorated to the energy state of the main drive pulse P1 when the induced signal VRs exceeding the reference threshold voltage Vcomp is generated in the initial section T1, and ranks up the main drive pulse P1 by considering the drive margin to be absent when the induced signal VRs generated in the section T2 is completely shifted to the section T3, wherein when the induced signal VRs is generated in the initial section T1 of the detection section T, the width of the section T1 is expanded.

Here, when the induced signal VRs exceeding the reference threshold voltage Vcomp is detected a predetermined multiple number of times in the initial section T1, the rotation detection unit can be configured to perform the detection thereof after the width of the initial section T1 is increased by a predetermined amount by shifting the end position Tcomp of the initial section T1 to the rear side and the width of another section T2 is reduced so that the width of the detection section T is not changed.

In addition, when the end position Tcomp of the initial section T1 is shifted to the rear side by a predetermined amount and then the induced signal VRs exceeding the reference threshold voltage Vcomp is not detected a predetermined multiple number of times in the initial section T1, the rotation detection unit can be configured to perform the detection thereof after the end position Tcomp of the initial section T1 is returned to an original state.

In addition, the detection section T is divided into the first section T1 coming after driving by the main drive pulse P1, the second section T2 coming after the first section T1, and the third section T3 coming after the second section T2. In a state where the rank n of the main drive pulse P1 is not changed, the first section T1 is a section for determining an initial forward rotation state of the rotor 202 in the second quadrant II of a space centering on the rotor 202 of the stepping motor 105, the second section T2 is a section for determining an initial forward rotation state of the rotor 202 in the second quadrant II and the third quadrant III, and the third section T3 is a section for determining a rotation state after an initial backward rotation of the rotor 202 in the third quadrant III. When the induced signal VRs exceeding the reference threshold voltage Vcomp is detected a predetermined multiple number of times in the first section T1, the rotation detection unit can be configured to performs the detection thereof after the end position Tcomp of the first section T1 is shifted further to the rear side by a predetermined amount than in a case where the induced signal VRs exceeding the reference threshold voltage Vcomp is not detected.

In addition, when the induced signal VRs exceeding the reference threshold voltage Vcomp is detected the predetermined multiple number of times in the first section T1, the rotation detection unit can be configured to perform the detection thereof after the width of the first section T1 is increased by a predetermined amount by shifting the end position Tcomp of the first section T1 to the rear side and the width of the second section T2 is reduced so that the width of the detection section T is not changed.

In addition, when the end position Tcomp of the first section T1 is shifted to the rear side by a predetermined amount and then the induced signal VRs exceeding the reference threshold voltage Vcomp is not detected a predetermined multiple number of times in the first section T1, the rotation detection unit can be configured to perform the detection thereof after the width of the first section T1 is reduced by return to an original state and the width of the second section T2 is increased so that the width of the detection section T is not changed.

Therefore, it is possible to suppress the generation of a situation in which rank-up is not performed due to a fluctuation in the period of time when the induced signal VRs is generated by the stepping motor 105, in spite of the main drive pulse P1 having no drive margin and rank-up being performed.

In addition, when the drive margin is absent, it is possible to prevent the induced signal VRs from flowing out from the section T1 to the section T2, and to avoid the impossibility of rotation due to driving by the main drive pulse having a rank maintained forcedly.

In addition, by suppressing the generation of a situation such as rank maintenance by the outflow of the induced signal Vrs to the section T2 in spite of the drive margin being absent due to a sudden load of the calendar display unit 110 or the like, and thus it is possible to perform appropriate rank-up.

In addition, since the generation of a rotation impossible state by the main drive pulse P1 can be avoided, the frequency of driving by the correction drive pulse P2 is suppressed, and thus it is possible to suppress power consumption. Therefore, when a battery is used as a power supply, it is possible to lengthen battery life.

In addition, according to the movement of the fifth embodiment of the invention, it is possible to produce an analog electronic timepiece capable of suppressing the generation of a situation in which rank-up is not performed due to a fluctuation in the period of time when the induced signal is generated by the stepping motor in spite of the main drive pulse having no drive margin and rank-up being performed.

In addition, according to the analog electronic timepiece of the fifth embodiment of the invention, it is possible to suppress the generation of a situation in which rank-up is not performed due to a fluctuation in the period of time when the induced signal is generated by the stepping motor in spite of the main drive pulse having no drive margin and rank-up being performed.

Meanwhile, in each of the embodiments, the detection section T is divided into three sections T1 to T3, but may be divided into two or more sections.

In addition, as a method of changing a boundary, it is possible to change only the boundary Tcomp1, to change the boundary Tcomp2 together with the boundary Tcomp1, to change only the boundary Tcomp2, or the like. In addition, the length of the detection section T can also be formed so as to be either invariable or variable.

In addition, in the each of the embodiments, the pulse widths are formed so as to be different from each other in order to change the energy of each drive pulse, but it is also possible to change drive energy by changing the number of comb-tooth pulses, changing a pulse voltage or the like.

In addition, an example of the electronic timepiece has been described as an application example of the stepping motor, but the stepping motor can be applied to an electronic device using a motor.

The stepping motor control circuit according to the invention can be applied to various types of electronic devices using the stepping motor.

In addition, the movement and the electronic timepiece according to the invention can be applied to various types of analog electronic timepieces, including an analog electronic wristwatch with a calendar function and a chronograph timepiece.

What is claimed is:

1. A stepping motor control circuit comprising:
a rotation detection unit that detects a induced signal exceeding a predetermined reference threshold value which is generated by a stepping motor in a detection section divided into at least three sections, and detects a rotation state on the basis of a pattern indicating whether the induced signal exceeding a reference threshold value is detected in each of the sections; and
a control unit that selects a main drive pulse depending on the rotation state detected by the rotation detection unit from a plurality of main drive pulses which are different from each other in energy, and drives the stepping motor,
wherein when the induced signal exceeding a reference threshold value is not detected in a first section which is an initial section out of the plurality of sections, the rotation detection unit detects the induced signal by shifting an end position of at least one section other than the initial section to a rear side by a predetermined amount.

2. The stepping motor control circuit according to claim 1, wherein the detection section is divided into first section coming after driving by the main drive pulse, a second section coming after the first section, and a third section coming after the second section, in a state where a rank of the main drive pulse is not changed, the first section being a section for determining an initial forward rotation state of a rotor in a second quadrant of a space centering on the rotor of the stepping motor, the second section being a section for determining an initial forward rotation state of the rotor in the second quadrant and a third quadrant, and the third section being a section for determining a rotation state after an initial backward rotation of the rotor in the third quadrant, and
when the induced signal exceeding a reference threshold value is not detected in the first section, the rotation detection unit detects the induced signal by shifting an end position of the second section further to a rear side by a predetermined amount than in a case where the induced signal exceeding the reference threshold value is detected.

3. The stepping motor control circuit according to claim 2, wherein when the induced signal exceeding a reference threshold value is not detected in the first section, the rotation detection unit detects the induced signal by increasing a width of the second section by shifting the end position of the second section to a rear side by a predetermined amount and reducing a width of the third section so that a width of the detection section is not changed.

4. The stepping motor control circuit according to claim 3, wherein when the induced signal exceeding a reference threshold value is not detected in the first section every time the control unit drives the stepping motor by the main drive pulse, the rotation detection unit detects the induced signal by shifting the end position of the second section further to a rear side by a predetermined amount than in a case where the induced signal exceeding a reference threshold value is detected.

5. The stepping motor control circuit according to claim 4, wherein when the end position of at least one section other than the initial section is shifted to a rear side by a predetermined amount, and then the induced signal exceeding a reference threshold value is detected in the initial section, the rotation detection unit performs detection by returning the end position of the section shifted to a rear side to an original state.

6. The stepping motor control circuit according to claim 3, wherein when the end position of at least one section other than the initial section is shifted to a rear side by a predetermined amount, and then the induced signal exceeding a reference threshold value is detected in the initial section, the rotation detection unit performs detection by returning the end position of the section shifted to a rear side to an original state.

7. The stepping motor control circuit according to claim 6, wherein when a pattern indicating that the main drive pulse is required to be ranked up is obtained a predetermined number of times at the time of performing the detection by returning the end position of the section shifted to a rear side to an original state, the rotation detection unit maintains the rank of the main drive pulse until the pattern is obtained the predetermined number of times, and performs the detection by shifting an end position of the section returned to an original state to a rear side by a predetermined amount when the pattern is obtained the predetermined number of times.

8. The stepping motor control circuit according to claim 2, wherein when the induced signal exceeding a reference threshold value is not detected in the first section every time the control unit drives the stepping motor by the main drive pulse, the rotation detection unit detects the induced signal by shifting the end position of the second section further to a rear side by a predetermined amount than in a case where the induced signal exceeding a reference threshold value is detected.

9. The stepping motor control circuit according to claim 8, wherein when the end position of at least one section other than the initial section is shifted to a rear side by a predetermined amount, and then the induced signal exceeding a reference threshold value is detected in the initial section, the rotation detection unit performs detection by returning the end position of the section shifted to a rear side to an original state.

10. The stepping motor control circuit according to claim 9, wherein when a pattern indicating that the main drive pulse is required to be ranked up is obtained a predetermined number of times at the time of performing the detection by returning the end position of the section shifted to a rear side to an original state, the rotation detection unit maintains the rank of the main drive pulse until the pattern is obtained the predetermined number of times, and performs the detection by shifting an end position of the section returned to an original state to a rear side by a predetermined amount when the pattern is obtained the predetermined number of times.

11. The stepping motor control circuit according to claim 2, wherein when the end position of at least one section other than the initial section is shifted to a rear side by a predetermined amount, and then the induced signal exceeding a reference threshold value is detected in the initial section, the rotation detection unit performs detection by returning the end position of the section shifted to a rear side to an original state.

12. The stepping motor control circuit according to claim 11, wherein when a pattern indicating that the main drive pulse is required to be ranked up is obtained a predetermined number of times at the time of performing the detection by returning the end position of the section shifted to a rear side to an original state, the rotation detection unit maintains the rank of the main drive pulse until the pattern is obtained the predetermined number of times, and performs the detection by shifting an end position of the section returned to an original state to a rear side by a predetermined amount when the pattern is obtained the predetermined number of times.

13. The stepping motor control circuit according to claim 1, wherein when the end position of at least one section other than the initial section is shifted to a rear side by a predetermined amount, and then the induced signal exceeding a reference threshold value is detected in the initial section, the rotation detection unit performs detection by returning the end position of the section shifted to a rear side to an original state.

14. The stepping motor control circuit according to claim 13, wherein when a pattern indicating that the main drive pulse is required to be ranked up is obtained a predetermined number of times at the time of performing the detection by returning the end position of the section shifted to a rear side to an original state, the rotation detection unit maintains the rank of the main drive pulse until the pattern is obtained the predetermined number of times, and performs the detection by shifting an end position of the section returned to an original state to a rear side by a predetermined amount when the pattern is obtained the predetermined number of times.

15. The stepping motor control circuit according to claim 1, wherein when the induced signal exceeding a reference threshold value is not detected in the first section, the rotation detection unit detects the induced signal by setting the end position of the second section to a second end position located at a rear side, and when the induced signal exceeding a reference threshold value is detected in the first section, the rotation detection unit detects the induced signal by setting the end position of the second section to a first end position located further frontward than the second end position and setting a boundary between the first section and the second section to a position located further rearward than in a case where the induced signal exceeding a reference threshold value is not detected in the first section.

16. The stepping motor control circuit according to claim 1, wherein the first section is configured to necessarily include a leading detection region in the entire detection section.

17. The stepping motor control circuit according to claim 1, wherein when the induced signal exceeding a reference threshold value is detected a predetermined multiple number of times in an initial section out of the plurality of sections, the rotation detection unit performs detection after an end position of the initial section is shifted to a rear side by a predetermined amount.

18. The stepping motor control circuit according to claim 17, wherein when the induced signal exceeding a reference threshold value is detected a predetermined multiple number of times in the initial section, the rotation detection unit performs detection after a width of the initial section is increased by a predetermined amount by shifting the end position of the initial section to a rear side and a width of another section is reduced so that the width of the detection section is not changed.

19. A movement comprising the stepping motor control circuit according to claim 1.

20. An analog electronic timepiece comprising the movement according to claim 19.

* * * * *